US012387710B2

(12) United States Patent
Lin et al.

(10) Patent No.: US 12,387,710 B2
(45) Date of Patent: Aug. 12, 2025

(54) AUDIO PROCESSING METHOD AND APPARATUS, VOCODER, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Shilun Lin, Shenzhen (CN); Xinhui Li, Shenzhen (CN); Li Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 315 days.

(21) Appl. No.: 17/965,130

(22) Filed: Oct. 13, 2022

(65) Prior Publication Data

US 2023/0035504 A1 Feb. 2, 2023

Related U.S. Application Data

(63) Continuation of application No. PCT/CN2021/132024, filed on Nov. 22, 2021.

(30) Foreign Application Priority Data

Dec. 30, 2020 (CN) ......................... 202011612387.8

(51) Int. Cl.
*G10L 13/02* (2013.01)
*G10L 13/047* (2013.01)
*G10L 13/08* (2013.01)

(52) U.S. Cl.
CPC ............ *G10L 13/02* (2013.01); *G10L 13/047* (2013.01); *G10L 13/08* (2013.01)

(58) Field of Classification Search
CPC ........ G10L 13/02; G10L 13/08; G10L 13/047
See application file for complete search history.

(56) References Cited

U.S. PATENT DOCUMENTS 4,790,015 A 12/1988 Callens et al.
5,617,507 A * 4/1997 Lee ......................... G10L 21/04 704/E13.007

(Continued)

FOREIGN PATENT DOCUMENTS

CN 101221763 A 7/2008
CN 102623016 A 8/2012

(Continued)

OTHER PUBLICATIONS

Valin, Jean-Marc, and Jan Skoglund. "LPCNet: Improving neural speech synthesis through linear prediction." ICASSP 2019-2019 IEEE International Conference on Acoustics, Speech and Signal Processing (ICASSP). IEEE, 2019. (Year: 2019).*

(Continued)

*Primary Examiner* — Paras D Shah
*Assistant Examiner* — Oluwadamilola M Ogunbiyi
(74) *Attorney, Agent, or Firm* — Anova Law Group, PLLC

(57) ABSTRACT

Embodiments of this application provide an audio processing method and apparatus, a vocoder, an electronic device, and a computer-readable storage medium. The audio processing method includes performing speech feature conversion on a text to obtain at least one acoustic feature frame; extracting a conditional feature corresponding to each acoustic feature frame from each acoustic feature frame of the at least one acoustic feature frame by a frame rate network; performing frequency division and time-domain down-sampling on the current frame of each acoustic feature frame to obtain n subframes corresponding to the current frame; synchronously predicting sample values correspond- (Continued)

ing to the current m adjacent sampling points on the n subframes to obtain m×n sub-prediction values; obtaining an audio prediction signal corresponding to the current frame; and performing audio synthesis on the audio prediction signal corresponding to each acoustic feature frame to obtain a target audio corresponding to the text.

20 Claims, 11 Drawing Sheets

(56) References Cited

U.S. PATENT DOCUMENTS

| | | | | |
|---|---|---|---|---|
| 11,417,314 | B2 | 8/2022 | Sun et al. | |
| 2010/0161327 | A1* | 6/2010 | Chandra | G10L 15/1807 704/235 |
| 2020/0066251 | A1* | 2/2020 | Kumano | G10L 13/10 |
| 2020/0082805 | A1* | 3/2020 | Zhang | G10L 13/027 |
| 2020/0135171 | A1* | 4/2020 | Tachibana | G10L 13/02 |
| 2020/0410976 | A1* | 12/2020 | Zhou | G06N 3/048 |
| 2021/0090555 | A1 | 3/2021 | Sun et al. | |
| 2021/0090584 | A1 | 3/2021 | Yu et al. | |
| 2022/0051654 | A1* | 2/2022 | Finkelstein | G06N 3/088 |
| 2022/0122579 | A1* | 4/2022 | Biadsy | G10L 25/30 |
| 2022/0165249 | A1* | 5/2022 | Wu | G10L 13/02 |

FOREIGN PATENT DOCUMENTS

| | | | | | |
|---|---|---|---|---|---|
| CN | 109559735 | A | * | 4/2019 | G10L 15/02 |
| CN | 110473516 | A | | 11/2019 | |
| CN | 111583903 | A | | 8/2020 | |
| CN | 112185340 | A | * | 1/2021 | G10L 13/02 |
| CN | 112562655 | A | * | 3/2021 | |
| CN | 113539231 | A | | 10/2021 | |
| CN | 113053356 | B | * | 5/2024 | G10L 13/08 |
| JP | 2022530797 | A | | 7/2022 | |

OTHER PUBLICATIONS

Cui, Yang, et al. "An Efficient Subband Linear Prediction for LPCNet-Based Neural Synthesis." Interspeech. 2020. (Year: 2020).*

Juvela, Lauri, et al. "Waveform generation for text-to-speech synthesis using pitch-synchronous multi-scale generative adversarial networks." ICASSP 2019-2019 IEEE International Conference on Acoustics, Speech and Signal Processing (ICASSP). IEEE, 2019. (Year: 2019).*

Wang, Gary, et al. "Improving speech recognition using consistent predictions on synthesized speech." ICASSP 2020-2020 IEEE International Conference on Acoustics, Speech and Signal Processing (ICASSP). IEEE, 2020. (Year: 2020).*

The World Intellectual Property Organization (Wipo) International Search Report for PCT/CN2021/132024 Jan. 28, 2022 6 Pages (including translation).

The European Patent Office (EPO) The Extended European Search Report for 21913592.8, Feb. 9, 2024 6 Pages.

The Japan Patent Office (JPO) Notification of Reasons for Refusal for Application No. 2023-518015 and Translation Apr. 8, 2024 8 Pages.

Yang Cui et al. "An Efficient Subband Linear Prediction for LPCNet-Based Neural Synthesis." Interspeech. 2020.

Jan Skoglund et al., "Improving Opus low bit rate quality with neural speech synthesis." arXiv preprint arXiv:1905.04628 (2019).

Jean-Marc Valin et al., "LPCNet: Improving neural speech synthesis through linear prediction." ICASSP 2019-2019 IEEE International Conference on Acoustics, Speech and Signal Processing (ICASSP). IEEE, 2019.

Jean-Marc Valin et al., "A real-time wideband neural vocoder at 1.6 kb/s using LPCNet." arXiv preprint arXiv:1903.12087 (2019).

* cited by examiner

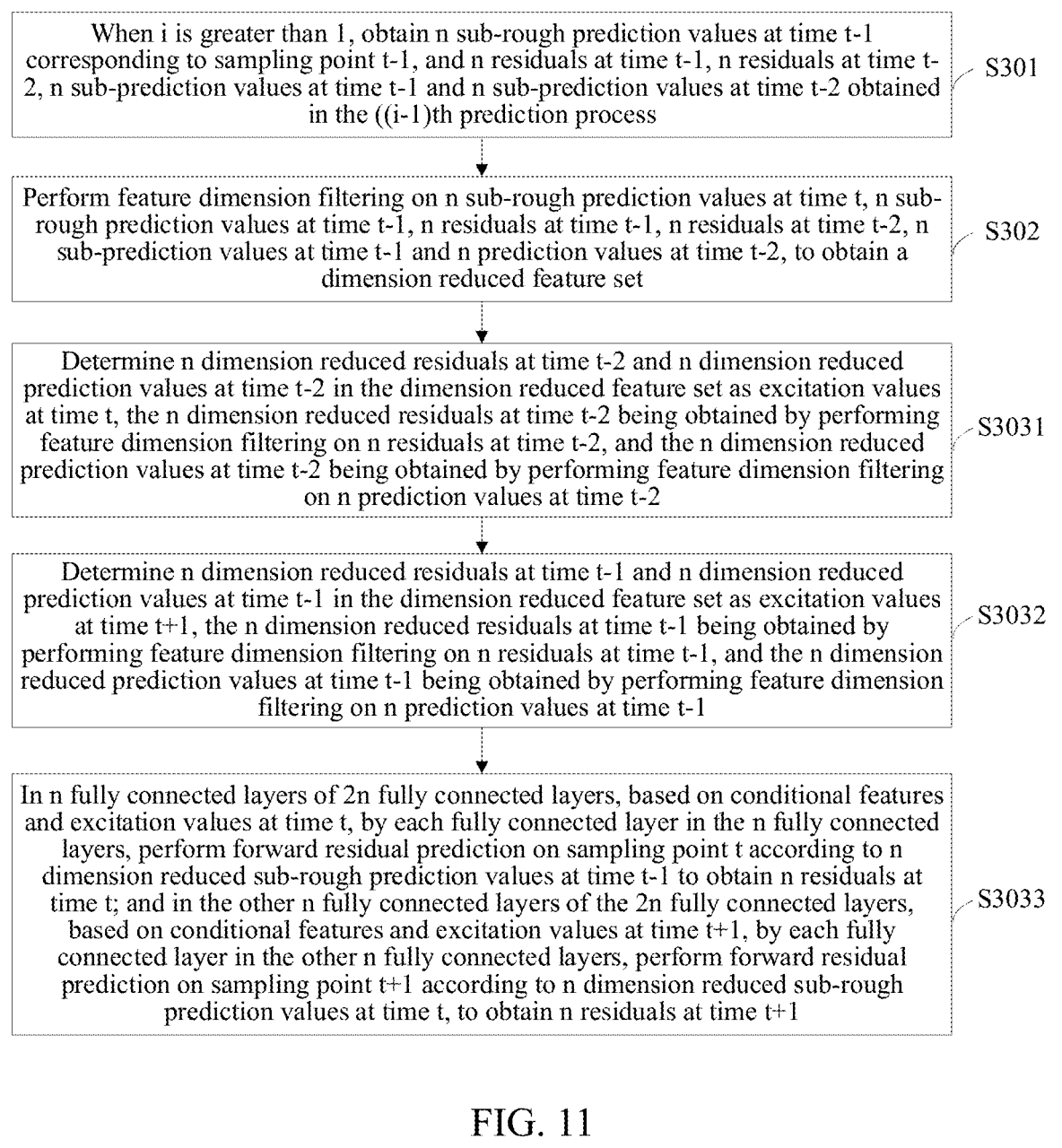

When i is greater than 1, obtain n sub-rough prediction values at time t-1 corresponding to sampling point t-1, and n residuals at time t-1, n residuals at time t-2, n sub-prediction values at time t-1 and n sub-prediction values at time t-2 obtained in the ((i-1)th prediction process — S301

↓

Perform feature dimension filtering on n sub-rough prediction values at time t, n sub-rough prediction values at time t-1, n residuals at time t-1, n residuals at time t-2, n sub-prediction values at time t-1 and n prediction values at time t-2, to obtain a dimension reduced feature set — S302

↓

Determine n dimension reduced residuals at time t-2 and n dimension reduced prediction values at time t-2 in the dimension reduced feature set as excitation values at time t, the n dimension reduced residuals at time t-2 being obtained by performing feature dimension filtering on n residuals at time t-2, and the n dimension reduced prediction values at time t-2 being obtained by performing feature dimension filtering on n prediction values at time t-2 — S3031

↓

Determine n dimension reduced residuals at time t-1 and n dimension reduced prediction values at time t-1 in the dimension reduced feature set as excitation values at time t+1, the n dimension reduced residuals at time t-1 being obtained by performing feature dimension filtering on n residuals at time t-1, and the n dimension reduced prediction values at time t-1 being obtained by performing feature dimension filtering on n prediction values at time t-1 — S3032

↓

In n fully connected layers of 2n fully connected layers, based on conditional features and excitation values at time t, by each fully connected layer in the n fully connected layers, perform forward residual prediction on sampling point t according to n dimension reduced sub-rough prediction values at time t-1 to obtain n residuals at time t; and in the other n fully connected layers of the 2n fully connected layers, based on conditional features and excitation values at time t+1, by each fully connected layer in the other n fully connected layers, perform forward residual prediction on sampling point t+1 according to n dimension reduced sub-rough prediction values at time t, to obtain n residuals at time t+1 — S3033

FIG. 11

AUDIO PROCESSING METHOD AND APPARATUS, VOCODER, ELECTRONIC DEVICE, COMPUTER-READABLE STORAGE MEDIUM, AND COMPUTER PROGRAM PRODUCT

RELATED APPLICATIONS

This application is a continuation of PCT Application No. PCT/CN2021/132024, filed on Nov. 22, 2021, which in turn claims priority to Chinese Patent Application No. 202011612387.8, entitled "AUDIO PROCESSING METHOD, VOCODER, APPARATUS, DEVICE, AND STORAGE MEDIUM", and filed on Dec. 30, 2020. The two applications are incorporated herein by reference in their entirety.

FIELD OF THE TECHNOLOGY

This application relates to audio and video processing technology, and in particular relates to an audio processing method and apparatus, a vocoder, an electronic device, a computer-readable storage medium, and a computer program product.

BACKGROUND OF THE DISCLOSURE

With rapid development of smart devices (e.g., smart phones and smart speakers), speech interaction technology is increasingly used as a natural interaction method. As an important part of the speech interaction technology, speech synthesis technology has also made great progress. The speech synthesis technology is used for converting a text into corresponding audio content by means of certain rules or model algorithms. Speech synthesis technology is based on a splicing method or a statistical parameter method. With continuous breakthrough of deep learning in the field of speech recognition, deep learning has been gradually introduced into the field of speech synthesis. As a result, neural network-based vocoders (Neural vocoder) have made great progress. However, the current vocoders usually need to perform multiple loops based on multiple sampling time points in an audio feature signal to complete speech prediction, and then complete speech synthesis, as such the speed of audio synthesis processing is low, and the efficiency of audio processing is low.

SUMMARY

Embodiments of this application provide an audio processing method and apparatus, a vocoder, an electronic device, a computer-readable storage medium, and a computer program product, capable of improving the speed and efficiency of audio processing.

The technical solutions of some embodiments are implemented as follows:

One aspect of this application provides an audio processing method, the method being executed by an electronic device, and including performing speech feature conversion on a text to obtain at least one acoustic feature frame; extracting a conditional feature corresponding to each acoustic feature frame from each acoustic feature frame of the at least one acoustic feature frame by a frame rate network; performing frequency division and time-domain down-sampling on the current frame of each acoustic feature frame to obtain n subframes corresponding to the current frame, n being a positive integer greater than 1, and each subframe of the n subframes comprising a preset number of sampling points; synchronously predicting, by a sampling prediction network, in the ith prediction process, sample values corresponding to the current m adjacent sampling points on the n subframes to obtain m×n sub-prediction values, and obtain n sub-prediction values corresponding to each sampling point of the preset number of sampling points, i being a positive integer greater than or equal to 1, and m being a positive integer greater than or equal to 2 and less than or equal to the preset number; obtaining an audio prediction signal corresponding to the current frame according to the n sub-prediction values corresponding to each sampling point; and performing audio synthesis on the audio prediction signal corresponding to each acoustic feature frame of the at least one acoustic feature frame to obtain a target audio corresponding to the text.

Another aspect of this application provides an electronic device, including a memory, configured to store executable instructions; and a processor, configured to implement the audio processing method provided in the embodiments of this disclosure when executing the executable instructions stored in the memory.

Another aspect of this application provides a non-transitory computer-readable storage medium, storing executable instructions, and configured to implement the audio processing method provided in embodiments of this disclosure when executed by a processor.

In embodiments of the present disclosure, by dividing the acoustic feature signal of each frame into multiple subframes in the frequency domain and down-sampling each subframe, the total number of sampling points to be processed during prediction of the sample values by the sampling prediction network is reduced. Furthermore, by simultaneously predicting multiple sampling points at adjacent times in one prediction process, synchronous processing of multiple sampling points is realized. Therefore, the number of loops required for prediction of the audio signal by the sampling prediction network is significantly reduced, the processing speed of audio synthesis is improved, and the efficiency of audio processing is improved.

BRIEF DESCRIPTION OF THE DRAWINGS

FIG. 11 is a schematic flow diagram 4 of an audio processing method provided by an embodiment of this application.

DESCRIPTION OF EMBODIMENTS

Figure 1:
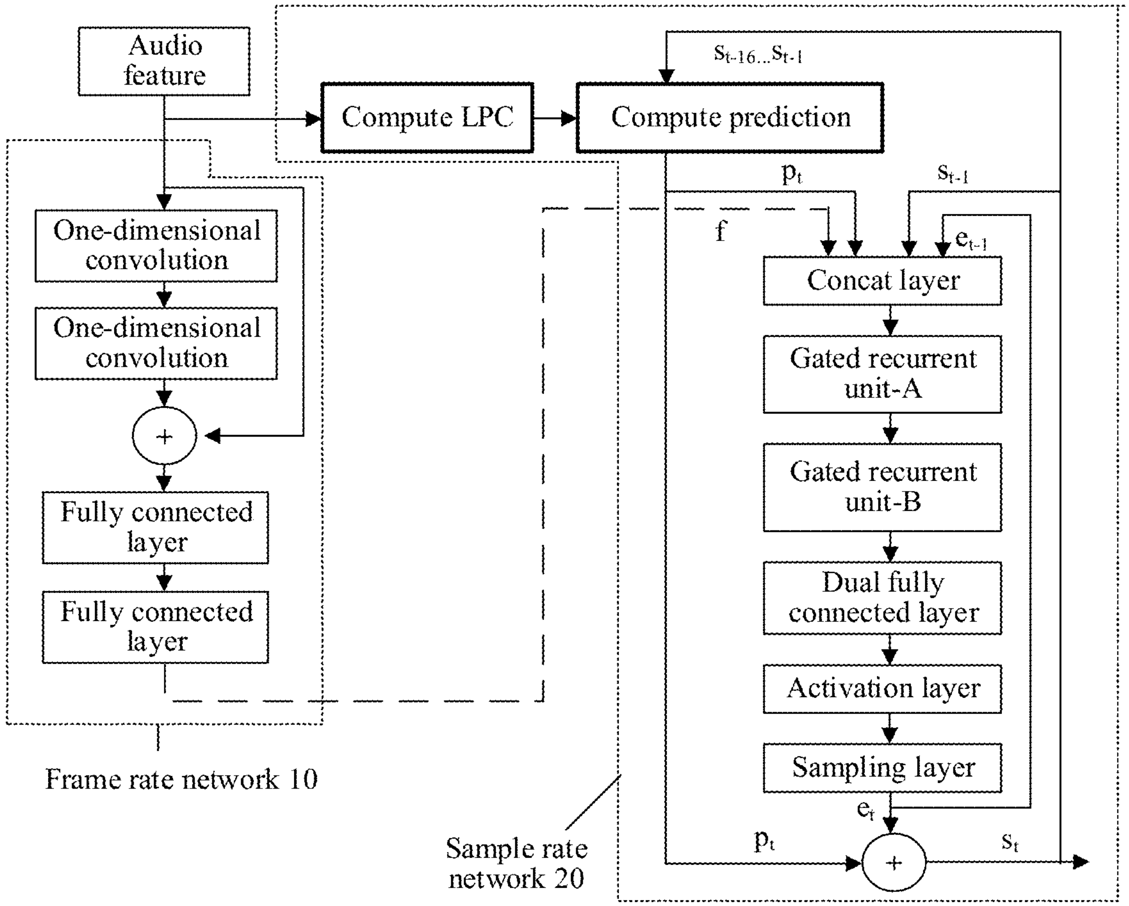
FIG. 1 is a schematic structural diagram of the current LPCNet vocoder provided by an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that some embodiments described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of some embodiments, but are not intended to limit this application.

Before some embodiments are further described in detail, terms involved in some embodiments are described. The terms provided in some embodiments are applicable to the following explanations.

1) Speech synthesis: Also known as Text to Speech (TTS), having a function of converting text information generated by a computer itself or input externally into a comprehensible and fluent speech and read it out.

2) Spectrograms: Referring to the representation of a signal in a time domain, in a frequency domain, obtainable by Fourier transformation of a signal. The results obtained are two graphs with amplitude and phase as the vertical axis and frequency as the horizontal axis respectively. In the application of speech synthesis technology, the phase information is mostly omitted, and only the corresponding amplitude information at different frequencies is retained.

3) Fundamental frequency: In audio signals, fundamental frequency refers to the frequency of a fundamental tone in a complex tone, represented by the symbol FO. Among several tones forming a complex tone, the fundamental tone has the lowest frequency and the highest intensity. The level of the fundamental frequency determines the level of a tone. The so-called frequency of a speech refers to the frequency of the fundamental tone.

4) Vocoder: Voice Encoder, also known as a speech signal analysis and synthesis system, having a function of converting acoustic features into sound.

5) GMM: Gaussian Mixture Model, being an extension of a single Gaussian probability-density function, using multiple Gaussian probability density functions to accurately perform statistical modeling on the distribution of variables.

6) DNN: Deep Neural Network, being a discriminative model, and a Multi-layer perceptron neural network (MLP) containing two or more hidden layers. Except for input nodes, each node is a neuron with a nonlinear activation function, and like MLPs, DNNs may be trained using a back-propagation algorithm.

7) CNN: Convolutional Neural Network, being a feed-forward neural network, the neurons of which are capable of responding to units in a receptive field. CNN usually includes multiple convolutional layers and a fully connected layer at the top, and reduces the number of parameters of a model by sharing parameters, thus being widely used in image and speech recognition.

8) RNN: Recurrent Neural Network, being a Recursive Neural Network taking sequence data as input, in which recursion is performed in the evolution direction of the sequence and all nodes (recurrent units) are connected in a chain.

9) LSTM: Long Short-Term Memory, being a recurrent neural network that adds a Cell for determining whether information is useful or not to an algorithm. Input gate, forget gate and output gate are placed in a Cell. After the information enters the LSTM, whether it is useful or not is determined according to rules. Only the information that conforms to an algorithm for authentication will be retained, and the nonconforming information will be forgotten through the forget gate. The network is suitable for processing and predicting important events with relatively long intervals and delays in a time series.

10) GRU: Gate Recurrent Unit, being a recurrent neural network. Like LSTM, GRU is also proposed to solve problems such as gradients in long-term memory and back propagation. Compared with LSTM, GRU lacks a "gate control" and has fewer parameters than LSTM. In most cases, GRU may achieve the same effect as LSTM and effectively reduce the computation time.

11) Pitch: Speech signals may be simply divided into two classes. One is voiced sound with short-term periodicity. When a person makes a voiced sound, an air flow through a glottis makes a vocal cord to vibrate in a relaxation oscillatory manner, producing a quasi-periodic pulsed air flow. This airflow stimulates a vocal tract to produce a voiced sound, also known as a voiced speech. The voiced speech carries most of the energy in the speech, and has a period called the pitch. The other is unvoiced sound with random noise properties, emitted by an oral cavity compressing air therein when a glottis is closed.

12) LPC: Linear Predictive Coding. A speech signal may be modeled as an output of a linear time-varying system, an input excitation signal of which is a periodic pulse (during a voiced period) or random noise (during an unvoiced period). The sampling of a speech signal may be approximated by linear fitting of past samples, and then a set of predictive coefficients, i.e., LPC, may be obtained by locally minimizing the square sum of the difference between actual sampling and linear predictive sampling.

13) LPCNet: Linear Predictive Coding Network, being a vocoder that combines digital signal processing and neural network ingeniously in speech synthesis, and being capable of synthesizing high-quality speech in real time on an ordinary CPU.

Among neural network-based vocoders, Wavenet, as the pioneering work of neural vocoders, provides an important reference for subsequent work in this field. However, due to a self-recursion (that is, predicting the current sampling point depends on the sampling point at the last time) forward mode, Wavenet is difficult to meet the requirements of large-scale online applications in real-time. In response to the problems of Wavenet, flow-based neural vocoders such as Parallel Wavenet and Clarinet emerged. Such vocoders make the distributions (mixed logistic distribution, and single Gaussian distribution) predicted by a teacher model and a student model as close as possible by distillation. After distillation learning, the overall speed may be improved using a parallelizable student model during forwarding. However, due to complex overall structure, fragmented training process and low training stability, flow-based vocoders may only achieve real-time synthesis on expensive GPUs, and are too expensive for large-scale online applications. Subsequently, self-recursive models with simpler structures, such as Wavernn and LPCNet, are successively produced. Quantization optimization and matrix sparse optimization are further introduced into the original simpler structure, so that favorable real-time performance is implemented on a single CPU. But for large-scale online applications, faster vocoders are in need.

An LPCNet vocoder includes a Frame Rate Network (FRN) and a Sample Rate Network (SRN). As shown in FIG. 1, a frame rate network 10 usually takes a multi-dimensional audio feature as input, and extracts high-level speech features through multi-layer convolution processing as the conditional feature f of the subsequent sample rate network 20. The sample rate network 20 computes an LPC coefficient based on the multi-dimensional audio feature, and based on the LPC coefficient and combined with a prediction value $S_{t-16} \ldots S_{t-1}$ of a sampling point obtained at a plurality of times before the current time, outputs a current rough prediction value $p_t$ corresponding to the sampling point at the current time by linear predictive coding. The sample rate network 20 takes a prediction value $S_{t-1}$ corresponding to the sampling point at the last time, a prediction error $e_{t-1}$ corresponding to the sampling point at the last time, the current rough prediction value $p_t$, and the conditional feature f outputted by the frame rate network 10 as input, and outputs a prediction error $e_t$ corresponding to the sampling point at the current time. After that, the sample rate network 20 pluses the current rough prediction value $p_t$ with the prediction error e corresponding to the sampling point at the current time to obtain a prediction value $S_t$ at the current time. The sample rate network 20 performs the same processing for each sampling point in the multi-dimensional audio feature, operates continuously in a loop, and finally completes prediction of the sample value for all sampling points, and the whole target audio to be synthesized is obtained according to the prediction values at all the sampling points. Usually, the number of sampling points in an audio is large, and taking a sample rate of 16 Khz as an example, a 10 ms audio contains 160 sampling points. Therefore, to synthesize a 10 ms audio, the SRN in the current vocoder needs to loop 160 times, and the overall computation amount is large, resulting in low speed and efficiency of audio processing.

Embodiments of this application provide an audio processing method and apparatus, a vocoder, an electronic device, and a computer-readable storage medium, capable of improving the speed and efficiency of audio processing. Applications of the electronic device provided by some embodiments are described below. The electronic device provided by some embodiments may be implemented as an intelligent robot, a smart speaker, a notebook computer, a tablet computer, a desktop computer, a set-top box, a mobile device (e.g., a mobile phone, a portable music player, a personal digital assistant, a dedicated messaging device, a portable game device), an intelligent speech interaction device, a smart home appliance, a vehicle-mounted terminal and other various types of user terminals, and may also be implemented as a server. An application of the electronic device implemented as a server will be described below.

Figure 2:
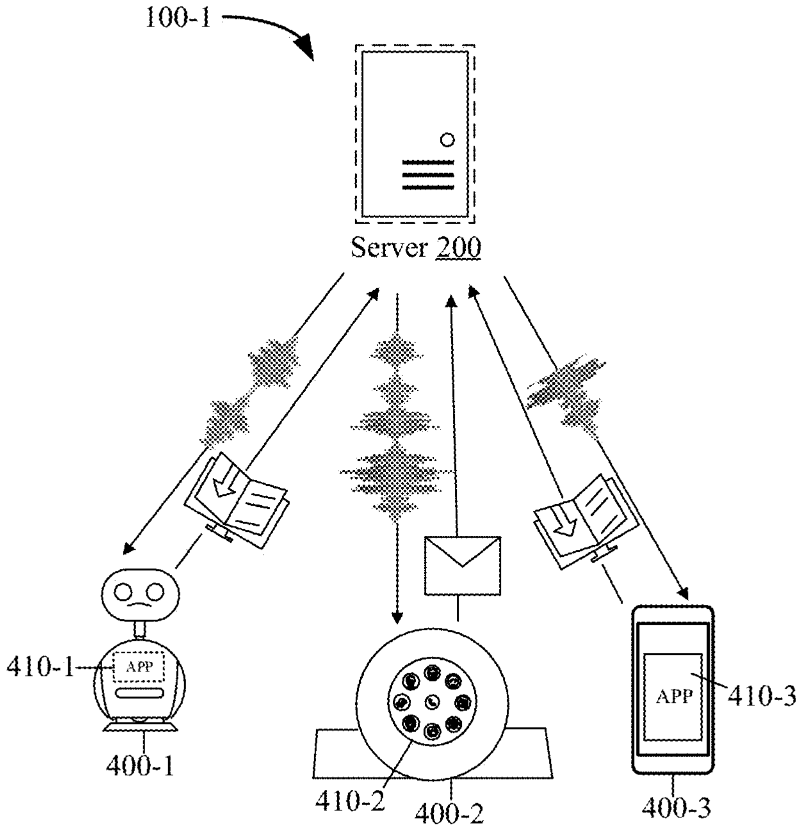
FIG. 2 is a schematic structural diagram 1 of an audio processing system architecture provided by an embodiment of this application.

FIG. 2 is a schematic architectural diagram of an audio processing system 100-1 provided by an embodiment of this application. To support an intelligent speech application, terminals 400 (exemplarily terminal 400-1, terminal 400-2 and terminal 400-3) are connected to a server 200 via a network, the network being a wide area network, or a local area network, or a combination thereof.

Clients 410 (exemplarily client 410-1, client 410-2 and client 410-3) of an intelligent speech application are installed on the terminals 400. The clients 410 may send a text to be processed, i.e., to be intelligently synthesized into a speech, to the server. The server 200 is configured to perform speech feature conversion on the text to be processed to obtain at least one acoustic feature frame after receiving the text to be processed; extract a conditional feature corresponding to each acoustic feature frame, by a frame rate network, from each acoustic feature frame of the at least one acoustic feature frame; perform frequency division and time-domain down-sampling on the current frame of each acoustic feature frame to obtain n subframes corresponding to the current frame, n being a positive integer greater than 1, and each subframe of the n subframes including a preset number of sampling points; synchronously predict, by a sampling prediction network, in the ith prediction process, sample values corresponding to the current m adjacent sampling points on the n subframes to obtain m×n sub-prediction values, and then obtain n sub-prediction values corresponding to each sampling point of the preset number of sampling points, i being a positive integer greater than or equal to 1, and m being a positive integer greater than or equal to 2 and less than or equal to the preset number; and obtain an audio prediction signal corresponding to the current frame according to the n sub-prediction values corresponding to each sampling point, and then, perform audio synthesis on the audio prediction signal corresponding to each acoustic feature frame of the at least one acoustic feature frame to obtain a target audio corresponding to the text to be processed. The server 200 may further perform post-processing, e.g., compression on the target audio, and return the processed target audio to the terminals 400 by way of returning in stream or the whole sentence. After receiving the returned audio, the terminals 400 may play a smooth and natural speech in the clients 410. In the whole processing process of the audio processing system 100-1, the server 200 may simultaneously predict the prediction values corresponding to multiple sub-band features at adjacent times by the sampling prediction network, and the number of loops required for audio prediction is less. Therefore, the delay of a background speech synthesis service of the server is very small, and the clients 410 may obtain the returned audio immediately. This enables users of the terminals 400 to hear the speech content converted from the text to be processed in a short period of time instead of reading the text with eyes, and the interaction is natural and convenient.

In some embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in some embodiments.

Figure 3:
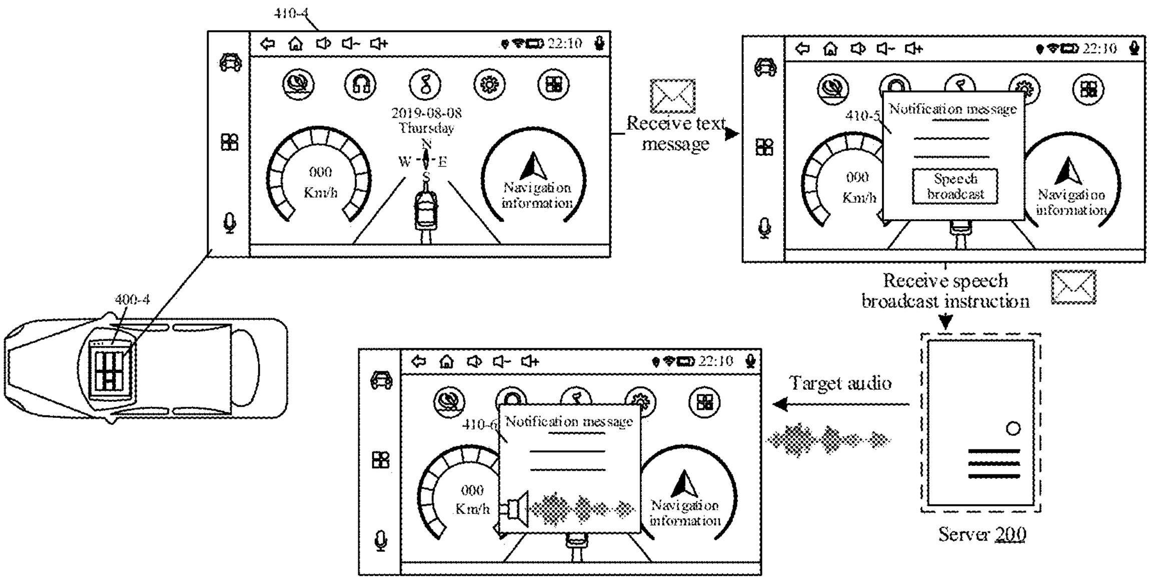
FIG. 3 is a schematic structural diagram 1 of an audio processing system provided by an embodiment of this application in a vehicle-mounted application scenario.

In some embodiments, as shown in FIG. 3, a terminal 400 may be a vehicle-mounted device 400-4. Exemplarily, the vehicle-mounted device 400-4 may be a vehicle-mounted computer installed inside a vehicle device, and also may be a control device or the like installed outside the vehicle device for controlling a vehicle. A client 410 of the intelligent speech application may be a vehicle-mounted service client 410-4, which is configured to display relevant driving information of the vehicle and provide control of various devices on the vehicle and other extended functions. When the vehicle-mounted service client 410-4 receives a text message from the outside, e.g., a news message, a road condition message, an emergency message or other messages containing text information, based on a user's operation instruction, for example, after the user triggers a speech broadcast instruction via operations such as speech, screen or keys on a message pop-up interface shown in 410-5, the vehicle-mounted service system sends a text message to the server 200 in response to the speech broadcast instruction. The server 200 extracts the text to be processed from the text message, and performs the aforementioned audio processing on the text to be processed to generate the corresponding target audio. The server 200 sends the target audio to the vehicle-mounted service client 410-4, and the vehicle-mounted service client 410-4 calls a vehicle-mounted multimedia device to play the target audio, and displays an audio playing interface as shown in 410-6.

Figure 4:
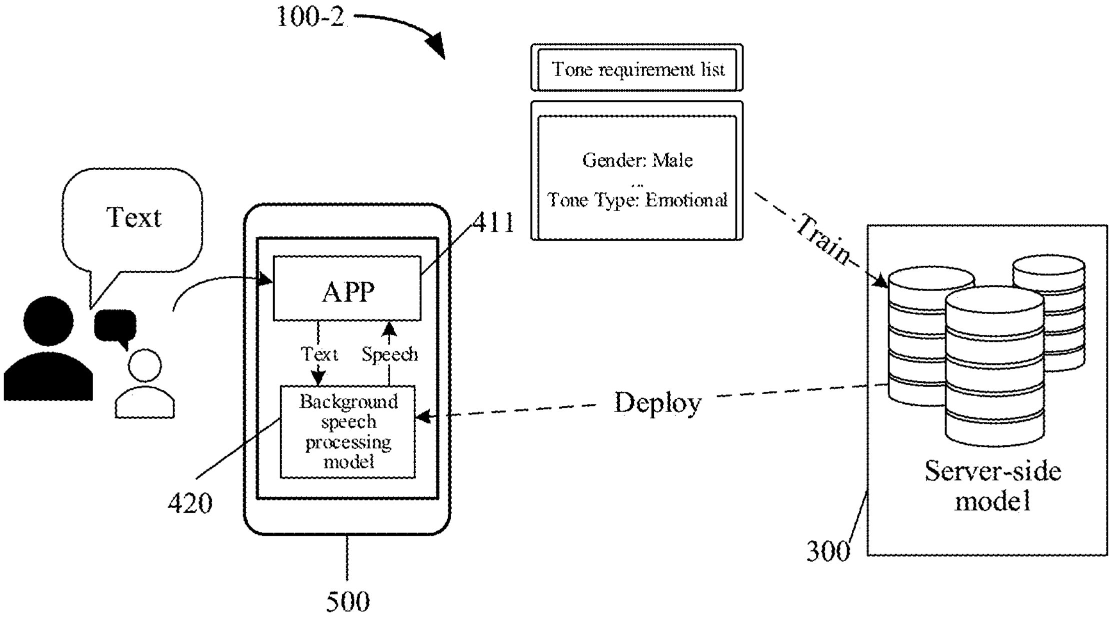
FIG. 4 is a schematic structural diagram 2 of an audio processing system architecture provided by an embodiment of this application.

An application of the electronic device implemented as a terminal will be described below. FIG. 4 is an optional schematic architectural diagram of an audio processing system 100-2 provided by an embodiment of this application. To support a customizable personalized speech synthesis application in a vertical field, e.g., a special tone speech synthesis service in the fields of novel reading, news broadcasting or the like, a terminal 500 is connected to a server 300 via a network, the network being a wide area network, or a local area network, or a combination thereof.

The server 300 is configured to form a speech database by collecting audios of various tones, e.g., audios of speakers of different genders or different tone types according to tone customization requirements, train a built-in initial speech synthesis model via the speech database to obtain a server-side model with a speech synthesis function, and deploy the trained server-side model on the terminal 500 as a background speech processing model 420 on the terminal 500. An intelligent speech application 411 (e.g., a reading APP, or a news client) is installed on the terminal 500. When a user wants a certain text to be read out via the intelligent speech application 411, the intelligent speech application 411 may obtain the text to be read out submitted by the user, and send the text as a text to be processed to the background speech model 420. The background speech model 420 is configured to perform speech feature conversion on the text to be processed to obtain at least one acoustic feature frame; extract a conditional feature corresponding to each acoustic feature frame, by a frame rate network, from each acoustic feature frame of the at least one acoustic feature frame; perform frequency division and time-domain down-sampling on the current frame of each acoustic feature frame to obtain n subframes corresponding to the current frame, n being a positive integer greater than 1, and each subframe of the n subframes including a preset number of sampling points; synchronously predict, by a sampling prediction network, in the ith prediction process, sample values corresponding to the current m adjacent sampling points on the n subframes to obtain m×n sub-prediction values, and then obtain n sub-prediction values corresponding to each sampling point of the preset number of sampling points, i being a positive integer greater than or equal to 1, and m being a positive integer greater than or equal to 2 and less than or equal to the preset number; and obtain an audio prediction signal corresponding to the current frame according to the n sub-prediction values corresponding to each sampling point, then, perform audio synthesis on the audio prediction signal corresponding to each acoustic feature frame of the at least one acoustic feature frame to obtain a target audio corresponding to the text to be processed, and send the target audio to a foreground interactive interface of the intelligent speech application 411 to play. Personalization customized speech synthesis puts forward higher requirements on the robustness, generalization, real-time performance and the like of a system. The modularizable end-to-end audio processing system provided by some embodiments may be flexibly adjusted according to the actual situation, and under the premise of hardly affecting the synthesis effect, high adaptability of the system is guaranteed for different requirements.

Figure 5:
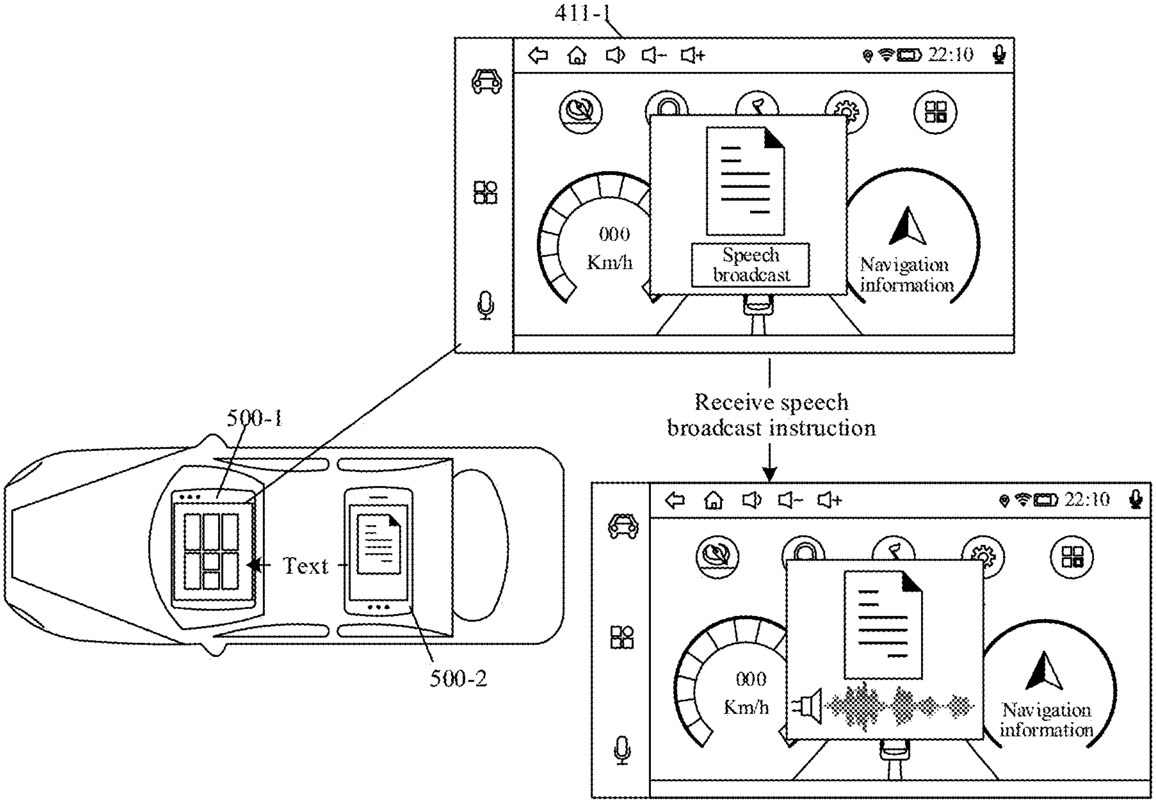
FIG. 5 is a schematic structural diagram 2 of an audio processing system provided by an embodiment of this application in a vehicle-mounted application scenario.

In some embodiments, referring to FIG. 5, a terminal 500 may be a vehicle-mounted device 500-1 connected to another user device 500-2 such as a mobile phone and a tablet computer, in a wired or wireless manner, exemplarily, via Bluetooth, or USB. The user device 500-2 may send a text of its own, e.g., a short message, or a document, to an intelligent speech application 411-1 on the vehicle-mounted device 500-1 via the connection. Exemplarily, in response to reception of a notification message, the user device 500-2 may automatically forward the notification message to the intelligent speech application 411-1, or the user device 500-2 may send a locally saved document to the intelligent speech application 411-1 based on a user's operation instruction on the user device application. In response to reception of the forwarded text, the intelligent speech application 411-1 may use the text content as a text to be processed based on the response to a speech broadcast instruction, perform the aforementioned audio processing on the text to be processed by a background speech model and generate the corresponding target audio. The intelligent speech application 411-1 then calls the corresponding interface display and vehicle-mounted multimedia device to play the target audio.

Figure 6:
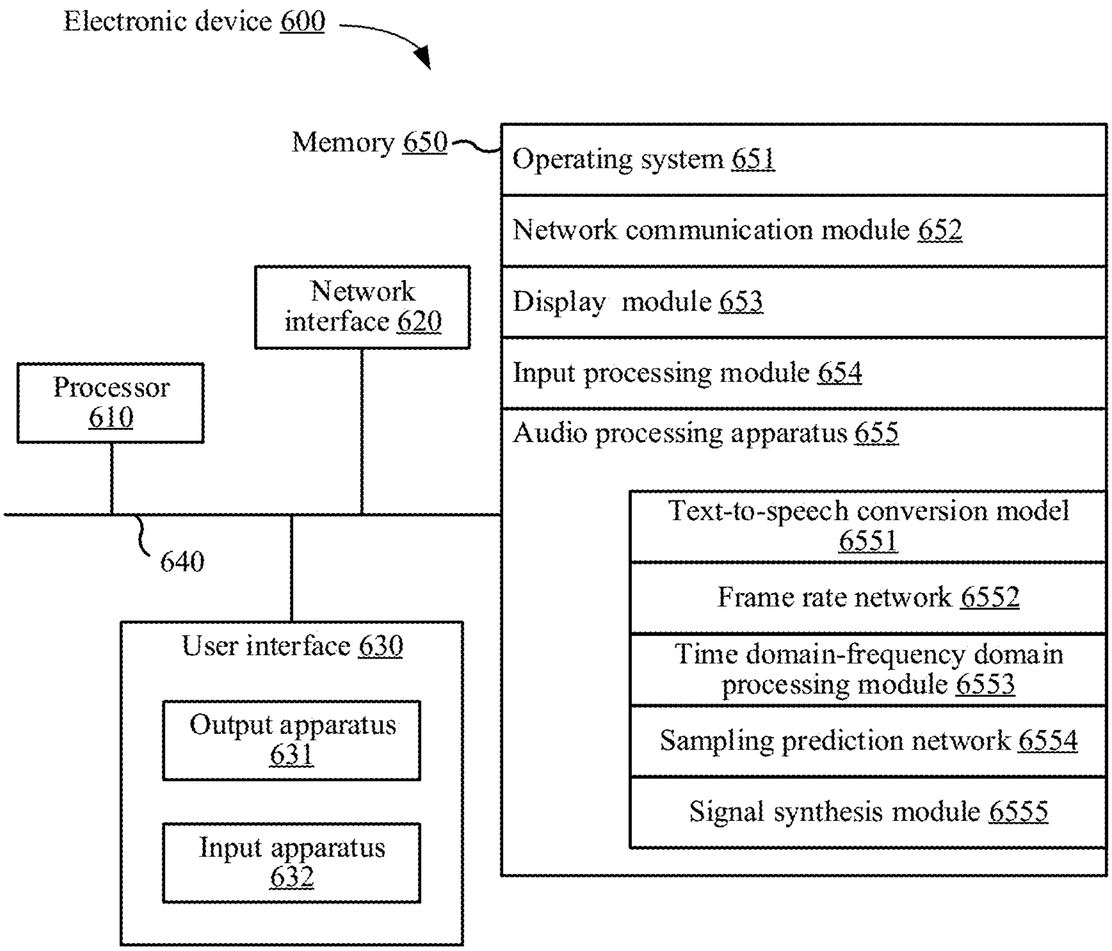
FIG. 6 is a schematic structural diagram of an electronic device provided by an embodiment of this application.

FIG. 6 is a schematic structural diagram of an electronic device 600 according to an embodiment of this application. The electronic device 600 shown in FIG. 6 includes: at least one processor 610, a memory 650, at least one network interface 620, and a user interface 630. All the components in the electronic device 600 are coupled together by using a bus system 640. It may be understood that the bus system 640 is configured to implement connection and communication between the components. In addition to a data bus, the bus system 640 further includes a power bus, a control bus, and a state signal bus. However, for ease of clear description, all types of buses are marked as the bus system 640 in FIG. 6.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 630 includes one or more output apparatuses 631 that can display media content, including one or more speakers and/or one or more visual display screens. The user interface 630 further includes one or more input apparatuses 632, including user interface components that facilitate inputting of a user, such as a keyboard, a mouse, a microphone, a touch display screen, a camera, and other input button and control.

The memory 650 may be a removable memory, a non-removable memory, or a combination thereof. In some embodiments, hardware devices include a solid-state memory, a hard disk drive, an optical disc driver, or the like. The memory 650 optionally includes one or more storage devices away from the processor 610 in a physical position.

The memory 650 includes a volatile memory or a non-volatile memory, or may include both a volatile memory and a non-volatile memory. The non-volatile memory may be a read-only memory (ROM). The volatile memory may be a random access memory (RAM). The memory 650 described in this embodiment of this application is to include any other suitable type of memories.

In some embodiments, the memory 650 may store data to support various operations. Examples of the data include a program, a module, and a data structure, or a subset or a superset thereof, which are described below by using examples.

An operating system 651 includes a system program configured to process various basic system services and perform a hardware-related task, such as a framework layer, a core library layer, or a driver layer, and is configured to implement various basic services and process a hardware-based task.

A network communication module 652 is configured to access other computing devices via one or more (wired or wireless) network interfaces 620, network interfaces 620 including: Bluetooth, Wireless Fidelity (WiFi), Universal Serial Bus (USB), etc.

A display module 653 is configured to display information by using an output apparatus 631 (for example, a display screen or a speaker) associated with one or more user interfaces 630 (for example, a user interface configured to operate a peripheral device and display content and information).

An input processing module 654 is configured to detect one or more user inputs or interactions from one of the one or more input apparatuses 632 and translate the detected input or interaction.

In some embodiments, an apparatus provided by an embodiment of this application may be implemented in software. FIG. 6 shows an audio processing apparatus 655 stored in a memory 650. The audio processing apparatus may be software in the form of a program or a plug-in, and includes the following software modules: a text-to-speech conversion model 6551, a frame rate network 6552, a time domain-frequency domain processing module 6553, a sampling prediction network 6554 and a signal synthesis module 6555. These modules are logical, and thus may be combined arbitrarily or further separated depending on functions implemented.

The following describes functions of the modules.

In some other embodiments, the apparatus provided in this embodiment of the application may be implemented by using hardware. For example, the apparatus provided in this embodiment of the application may be a processor in a form of a hardware decoding processor, programmed to perform the audio processing method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

An embodiment of this application provides a multi-band multi-time-domain vocoder. The vocoder may be combined with a text-to-speech conversion model to convert at least one acoustic feature frame outputted by the text-to-speech conversion model according to a text to be processed into a target audio. The vocoder may also be combined with audio feature extraction modules in other audio processing systems to convert the audio features outputted by the audio feature extraction modules into audio signals. Specific selection is made according to the actual situation, and not limited in some embodiments.

Figure 7:
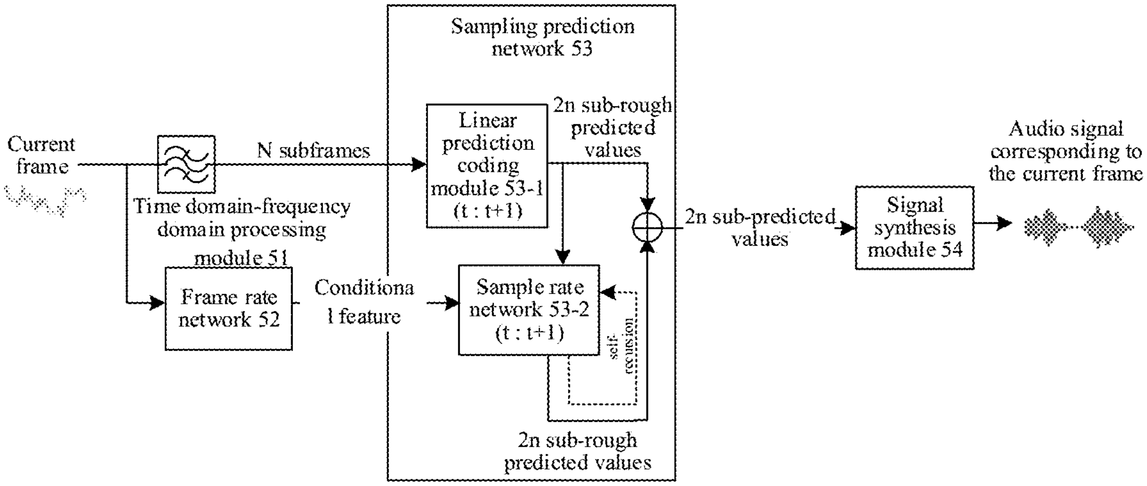
FIG. 7 is a schematic structural diagram of a multi-band multi-time-domain vocoder provided by an embodiment of this application.

As shown in FIG. 7, a vocoder provided by an embodiment of this application includes a time domain-frequency domain processing module 51, a frame rate network 52, a sampling prediction network 53 and a signal synthesis module 54. The frame rate network 52 may perform high-level abstraction on an input acoustic feature signal, and extract a conditional feature corresponding to the frame from each acoustic feature frame of at least one acoustic feature frame. Then, the vocoder may predict a sample signal value at each sampling point in the acoustic feature frame based on the conditional feature corresponding to each acoustic feature frame. As an example, when the vocoder processes the current frame of at least one acoustic feature frame, for the current frame of each acoustic feature frame, the time domain-frequency domain processing module 51 may perform frequency division and time-domain down-sampling on the current frame to obtain n subframes corresponding to the current frame, each subframe of the n subframes including a preset number of sampling points. The sampling prediction network 53 is configured to synchronously predict, in the ith prediction process, sample values corresponding to the current m adjacent sampling points on the n subframes to obtain m×n sub-prediction values, and then obtain n sub-prediction values corresponding to each sampling point of the preset number of sampling points, i being a positive integer greater than or equal to 1, and m being a positive integer greater than or equal to 2 and less than or equal to the preset number. The signal synthesis module 54 is configured to obtain an audio prediction signal corresponding to the current frame according to the n sub-prediction values corresponding to each sampling point, and then, perform audio synthesis on the audio prediction signal corresponding to each acoustic feature frame to obtain a target audio corresponding to a text to be processed.

Human voice is produced by an airflow squeezed out of human lungs upon a vocal cord to produce shock waves, and the shock waves are transmitted to ears through the air. Hence, a sampling prediction network may predict the sample value of an audio signal via a sound source excitation (simulating an airflow from lungs) and vocal tract response system. In some embodiments, a sampling prediction network 53 may include a linear predictive coding module 53-1 and a sample rate network 53-2 as shown in FIG. 7. The linear predictive coding module 53-1 may compute sub-rough prediction values corresponding to each sampling point of m sampling points on n subframes as a vocal tract response. The sample rate network 53-2 may use m sampling points as a time span of forward prediction in one prediction process according to conditional features extracted by a frame rate network 52, and complete prediction of the corresponding residuals of each sampling point of the m adjacent sampling points on n subframes as a sound source excitation. Then the corresponding audio signal is simulated according to the vocal tract response and the sound source excitation.

In some embodiments, taking m equal to 2, that is, the prediction time span of a sampling prediction network being 2 sampling points as an example, in the ith prediction process, the linear predictive coding module 53-1 may, according to n sub-prediction values corresponding to each historical sampling point of at least one historical sampling point at time t corresponding to sampling point t at the current time t, perform linear coding prediction on linear sample values of sampling point t on n subframes, to obtain n sub-rough prediction values at time t as the vocal tract response of sampling point t. During prediction of residuals corresponding to sampling point t, since the prediction time span is 2 sampling points, the sample rate network 53-2 may use n residuals at time t−2 and n sub-prediction values at time t−2 corresponding to sampling point t−2 in the (i−1)th prediction process as excitation values, and combined with conditional features and n sub-rough prediction values at time t−1, perform forward prediction on the residuals corresponding to sampling point t respectively on n subframes, to obtain n residuals at time t corresponding to sampling point t. Also, during the prediction of residuals corresponding to sampling point t, n residuals at time t−1 and n sub-prediction values at time t−1 corresponding to sampling point t−1 in the (i−1)th prediction process are used as excitation values, and combined with conditional features, forward prediction is performed on residuals corresponding to sampling point t+1 respectively on n subframes, to obtain n residuals at time t+1 corresponding to sampling point t+1. The sample rate network 53-2 may perform residual prediction in a self-recursive manner on a preset number of down-sampled sampling points on the n subframes according to the above process, until n residuals corresponding to each sampling point are obtained.

In some embodiments, a sampling prediction network 53 may obtain n sub-prediction values at time t corresponding to sampling point t according to n residuals at time t and n sub-rough prediction values at time t, use sampling point t as one of at least one historical sampling point at time t+1 corresponding to sampling point t+1, and according to the sub-prediction values corresponding to each historical sampling point at time t+1 of the at least one historical sampling point at time t+1, perform linear coding prediction on linear sample values corresponding to sampling point t+1 on n subframes, to obtain n sub-rough prediction values at time t+1 as the vocal tract response of sampling point t. Then, n sub-prediction values at time t+1 are obtained according to the n sub-rough prediction values at time t+1 and the n residuals at time t+1, and the n sub-prediction values at time t and the n sub-prediction values at time t+1 are used as 2n sub-prediction values, thereby completing the ith prediction process. After the ith prediction process, the sampling prediction network 53 updates the current two adjacent sampling points t and t+1, and starts the (i+1)th prediction process of sample values, until the preset number of sampling points are all predicted. The vocoder may obtain the signal waveform of an audio signal corresponding to the current frame via the signal synthesis module 54.

The vocoder provided by some embodiments effectively reduces the amount of computation required to convert acoustic features into audio signals, implements synchronous prediction of multiple sampling points, and may output audios that are highly intelligible, natural and with high fidelity while maintaining a high real-time rate.

In the above embodiments, setting the prediction time span of the vocoder to two sampling points, that is, setting m as 2, is an application based on comprehensive consideration of the processing efficiency of the vocoder and the audio synthesis quality. In practical application, m may be set to other time span parameter values as required by a project, which is specifically selected according to the actual situation, and not limited in some embodiments. When m is set to other values, the selection of excitation values corresponding to each sampling point in the prediction process and in each prediction process is similar to that when m equals to 2, and details are not repeated here.

The audio processing method provided by some embodiments will be described below in conjunction with application and implementation of an electronic device 600 provided by an embodiment of this application.

Figure 8:
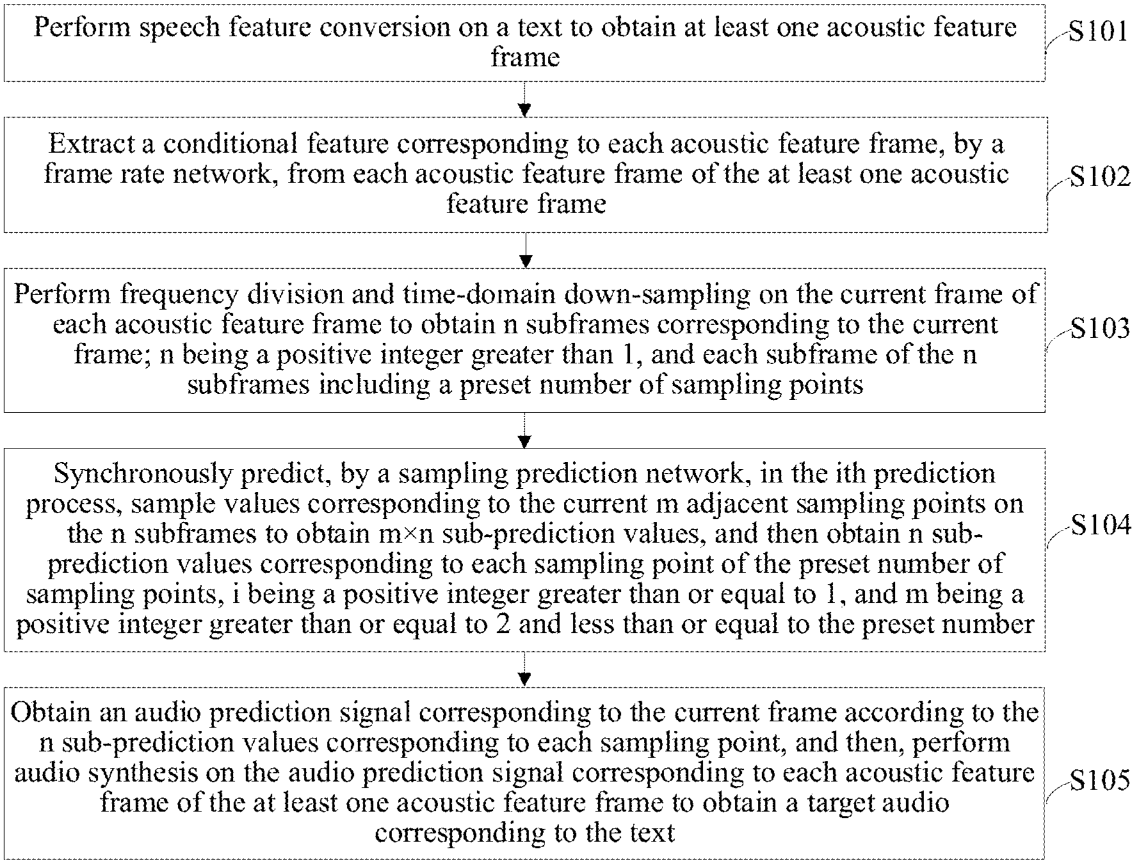
FIG. 8 is a schematic flow diagram 1 of an audio processing method provided by an embodiment of this application.

FIG. 8 is an optional schematic flowchart of the audio processing method provided by some embodiments, and the steps shown in FIG. 8 will be described below.

S101: Perform speech feature conversion on a text to be processed to obtain at least one acoustic feature frame.

The audio processing method provided by some embodiments may be applied to a cloud service of an intelligent speech application, and then serve users of the cloud service, e.g., intelligent customer service of banks, and learning software such as word memorization software; intelligent speech scenarios such as intelligent reading of books and news broadcasts applied locally on a terminal; and automatic driving scenarios or vehicle-mounted scenarios, such as speech interaction-based internet of vehicles or smart traffic, which is not limited in some embodiments.

In some embodiments, the electronic device may perform speech feature conversion on a text message to be converted by a preset text-to-speech conversion model, and output at least one acoustic feature frame.

In some embodiments, a text-to-speech conversion model may be a sequence-to-sequence model constructed by a CNN, a DNN, or an RNN, and the sequence-to-sequence model mainly includes an encoder and a decoder. The encoder may abstract a series of data with continuous relationships, e.g., speech data, raw text and video data, into a sequence, extract a robust sequence expression from a character sequence in the original text, e.g., a sentence, and encode the robust sequence expression into a vector capable of being mapped to a fixed length of the sentence content, such that the natural language in the original text is converted into digital features that can be recognized and processed by a neural network. The decoder may map the fixed-length vector obtained by the encoder into an acoustic feature of the corresponding sequence, and aggregate the features on multiple sampling points into one observation unit, that is, one frame, to obtain at least one acoustic feature frame.

In some embodiments, at least one acoustic feature frame may be at least one audio spectrum signal, which may be represented by a frequency-domain spectrogram. Each acoustic feature frame contains a preset number of feature dimensions representing the number of vectors in the feature. The vectors in the feature are used for describing various feature information, such as pitch, formant, spectrum and vocal range function. Exemplarily, at least one acoustic feature frame may be a Mel scale spectrogram, a linear logarithmic amplitude spectrogram, a Bark scale spectrogram, or the like. The method for extracting at least one acoustic feature frame and the data form of features are not limited in some embodiments.

In some embodiments, each acoustic feature frame may include 18-dimensional BFCC features (Bark-Frequency Cepstral Coefficients) plus 2-dimensional pitch related features.

Since the frequency of an analog signal of sound in daily life is 8 kHz or less, according to sampling theorem, a sample rate of 16 kHz is enough to obtain sampled audio data containing most of sound information. 16 kHz means sampling 16 k signal samples in 1 second. In some embodiments, the frame length of each acoustic feature frame may be 10 ms, and for an audio signal with a sample rate of 16 kHZ, each acoustic feature frame may include 160 sampling points.

S102: Extract a conditional feature corresponding to each acoustic feature frame, by a frame rate network, from each acoustic feature frame of the at least one acoustic feature frame.

In some embodiments, an electronic device may perform multi-layer convolution on at least one acoustic feature frame via a frame rate network, and extract a high-level speech feature of each acoustic feature frame as a conditional feature corresponding to the acoustic feature frame.

In some embodiments, an electronic device may convert a text to be processed into 100 acoustic feature frames via S101, and then simultaneously process the 100 acoustic feature frames by a frame rate network to obtain corresponding conditional features of the 100 frames.

In some embodiments, a frame rate network may include two convolutional layers and two fully connected layers in series. Exemplarily, the two convolutional layers may be two convolutional layers with a filter size of 3 (conv3×1). For an acoustic feature frame containing 18-dimensional BFCC features plus 2-dimensional tone features, the 20-dimensional features in each frame are first passed through two convolutional layers. A receptive field of 5 frames is generated from the last two acoustic feature frames, the current acoustic feature frame and the following two acoustic feature frames, and the receptive field of 5 frames is added to residual connection. Then, a 128-dimensional conditional vector f is outputted via the two fully connected layers as a conditional feature to be used for assisting a sample rate network for performing forward residual prediction.

In some embodiments, for each acoustic feature frame, a conditional feature corresponding to a frame rate network is only computed once. That is, when a sample rate network predicts in a self-recursive manner sampling values corresponding to down-sampled multiple sampling points corresponding to the acoustic feature frame, the conditional feature corresponding to the frame remains unchanged during the recursive prediction process corresponding to the frame.

S103: Perform frequency division and time-domain down-sampling on the current frame of each acoustic feature frame to obtain n subframes corresponding to the current frame, n being a positive integer greater than 1, and each subframe of the n subframes including a preset number of sampling points.

In some embodiments, to reduce the number of cyclic predictions performed by a sampling prediction network, an electronic device may perform frequency division on the current frame of each acoustic feature frame, and then, down-sample the sampling points in the time domain included in the divided frequency bands to reduce the number of sampling points included in each divided frequency band, thereby obtaining n subframes corresponding to the current frame.

In some embodiments, a frequency-domain division process may be implemented by a filter bank. Exemplarily, when n equals to 4, for a current frame with a frequency domain range of 0-8 k, by a filter bank including four band-pass filters, e.g., a Pseudo-QMF (Pseudo Quadratue Mirror Filter Bank), taking 2 k bandwidth as a unit, an electronic device may divide features corresponding to 0-2 k, 2-4 k, 4-6 k, and 6-8 k frequency bands respectively from the current frame, and correspondingly obtain 4 initial subframes corresponding to the current frame.

In some embodiments, for a case that a current frame contains 160 sampling points, after an electronic device divides the current frame into initial subframes in 4 frequency domains, since frequency-domain division is only based on the frequency band, each initial subframe still contains 160 sampling points. The electronic device further down-samples each initial subframe by a down-sampling filter to reduce the number of sampling points in each initial subframe to 40, and then obtains 4 subframes corresponding to the current frame.

In some embodiments, an electronic device may perform frequency division on a current frame by means of other software or hardware, which is specifically selected according to the actual situation, and not limited in some embodiments. When an electronic device performs frequency division and time-domain down-sampling on each frame of the at least one acoustic feature frame, each frame may be regarded as a current frame, and frequency division and time-domain down-sampling are performed by the same process.

S104: Synchronously predict, by a sampling prediction network, in the ith prediction process, sample values corresponding to the current m adjacent sampling points on the n subframes to obtain m×n sub-prediction values, and then obtain n sub-prediction values corresponding to each sampling point of the preset number of sampling points, i being a positive integer greater than or equal to 1, and m being a positive integer greater than or equal to 2 and less than or equal to the preset number.

In some embodiments, after obtaining at least one acoustic feature frame, the electronic device needs to convert the at least one acoustic feature frame into a waveform expression of an audio signal. Accordingly, for one acoustic feature frame, the electronic device needs to predict the spectrum amplitude on a linear frequency scale corresponding to each sampling point in the frequency domain, use the spectrum amplitude as the sampling prediction value of each sampling point, and then, obtain the audio signal waveform corresponding to the acoustic feature frame by the sampling prediction value of each sampling point.

In some embodiments, each subframe in the frequency domain includes the same sampling points in the time domain, i.e., a preset number of sampling points at the same time. In one prediction process, an electronic device may simultaneously predict sampling values corresponding to n subframes in the frequency domain, at m sampling points at adjacent times, to obtain m×n sub-prediction values, such that the number of loops required to predict an acoustic feature frame may be reduced.

In some embodiments, an electronic device may predict m adjacent sampling points of a preset number of sampling points in the time domain by the same process. For example, the preset number of sampling points include sampling points $t_1$, $t_2$, $t_3$, $t_4$ . . . $t_4$. When m equals to 2, the electronic device may synchronously process sampling point $t_1$ and sampling point $t_2$ in one prediction process, that is, in one prediction process, n sub-prediction values corresponding to sampling point $t_1$ on n subframes in the frequency domain and n sub-prediction values corresponding to sampling point $t_2$ on n subframes are simultaneously predicted as 2n sub-prediction values; and in the next prediction process, sampling points $t_3$ and $t_4$ are regarded as the current two adjacent sampling points, and sampling points $t_3$ and $t_4$ are processed synchronously in the same way to predict 2n sub-prediction values corresponding to sampling points $t_3$ and $t_4$ simultaneously. The electronic device completes sampling value prediction for all sampling points of the preset number of sampling points in a self-recursive manner by the sampling prediction network, and obtains n sub-prediction values corresponding to each sampling point.

S105: Obtain an audio prediction signal corresponding to the current frame according to the n sub-prediction values corresponding to each sampling point, and then, perform audio synthesis on the audio prediction signal corresponding to each acoustic feature frame of the at least one acoustic feature frame to obtain a target audio corresponding to the text to be processed.

In some embodiments, the n sub-prediction values corresponding to each sampling point represent a predicted amplitude of an audio signal of the sampling point on n frequency bands. For each sampling point, an electronic device may merge n sub-prediction values corresponding to the sampling point in the frequency domain to obtain a signal prediction value corresponding to the sampling point on a full band. According to the order in a preset time series corresponding to each sampling point in the current frame, the electronic device merges the signal prediction values corresponding to each sampling point in the time domain to obtain an audio prediction signal corresponding to the current frame.

In some embodiments, a sampling prediction network performs the same process on each acoustic feature frame, may predict all signal waveforms by at least one acoustic feature frame, and then obtains a target audio.

In some embodiments, the electronic device divides the acoustic feature signal of each frame into multiple subframes in the frequency domain and down-samples each subframe, such that the total number of sampling points to be processed during prediction of sample values by the sampling prediction network is reduced. Furthermore, by simultaneously predicting multiple sampling points at adjacent times in one prediction process, the electronic device implements synchronous processing of multiple sampling points. Therefore, the number of loops required for prediction of the audio signal by the sampling prediction network is significantly reduced, the processing speed of audio synthesis is improved, and the efficiency of audio processing is improved.

In some embodiments of this application, S103 may be implemented by performing S1031-S1032 as follows:

S1031: Perform frequency-domain division on a current frame to obtain n initial subframes; and

S1032: Down-sample time-domain sampling points corresponding to the n initial subframes to obtain n subframes.

By down-sampling each subframe in the time domain, redundant information in each subframe may be removed, and the number of processing loops required for performing recursive prediction by a sampling prediction network may be reduced, thereby further improving the speed and efficiency of audio processing.

Figure 9:
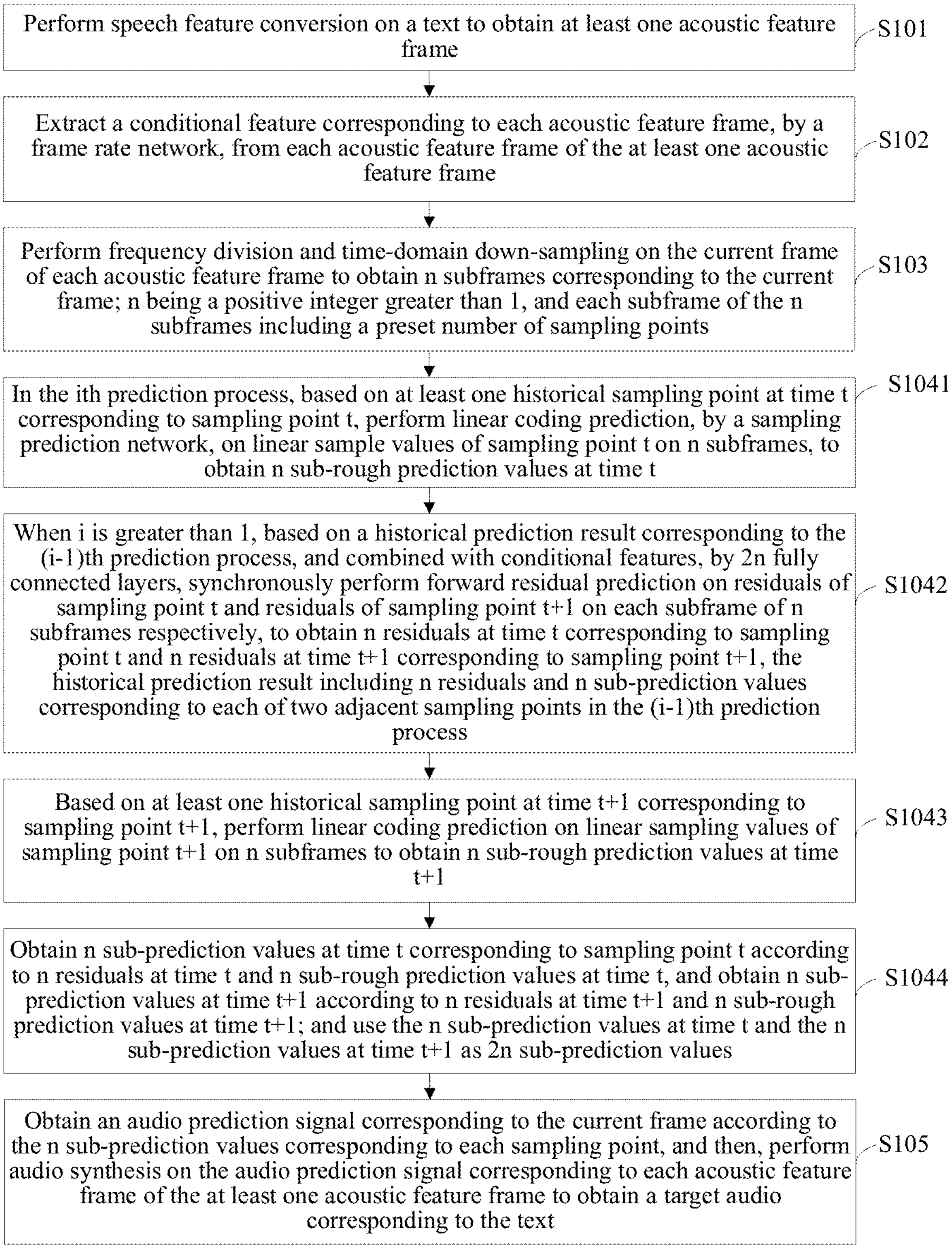
FIG. 9 is a schematic flow diagram 2 of an audio processing method provided by an embodiment of this application.

In some embodiments, when m equals to 2, a sampling prediction network may include 2n independent fully connected layers, and m adjacent sampling points include: in the ith prediction process, sampling point t corresponding to the current time t and sampling point t+1 corresponding to the next time t+1, t being a positive integer greater than or equal to 1. As shown in FIG. 9, S104 in FIG. 8 may be implemented by S1041-S1044, which will be described below.

S1041: In the ith prediction process, based on at least one historical sampling point at time t corresponding to sampling point t, perform linear coding prediction, by a sampling prediction network, on linear sample values of sampling point t on n subframes, to obtain n sub-rough prediction values at time t.

In some embodiments, in the ith prediction process, an electronic device first performs linear coding prediction, by a sampling prediction network, on n linear sampling values corresponding to sampling point t at the current time on n subframes to obtain n sub-rough prediction values at time t.

In some embodiments, in the ith prediction process, during prediction of n sub-rough prediction values at time t corresponding to sampling point t, a sampling prediction network needs to refer to a signal prediction value of at least one historical sampling point before sampling point t, and solve a signal prediction value at time t of sampling point t by means of linear combination. The maximum number of historical sampling points that the sampling prediction network needs to refer to is a preset window threshold. The electronic device may determine at least one historical sampling point corresponding to the linear coding prediction of sampling point t according to the order of sampling point tin a preset time series, in combination with the preset window threshold of the sampling prediction network.

In some embodiments, before S1041, an electronic device may determine at least one historical sampling point at time t corresponding to sampling point t by performing S201 or S202 as follows:

S201: When t is less than or equal to a preset window threshold, use all sampling points before sampling point t as at least one historical sampling point at time t, the preset window threshold representing the maximum quantity of sampling points processible by linear coding prediction.

In some embodiments, when a current frame contains 160 sampling points, and a preset window threshold is 16, that is, the maximum queue that can be processed is all sub-prediction values corresponding to 16 sampling points during one prediction performed by a linear prediction module in a sampling prediction network, for sampling point 15, since the order in a preset time series where sampling point 15 is does not exceed the preset window threshold, the linear prediction module may use all sampling points before sampling point 15, that is, 14 sampling points from sampling point 1 to sampling point 14, as at least one historical sampling point at time t.

S202: When t is greater than a preset window threshold, use sampling points from sampling point t−1 to sampling point t−k, as at least one historical sampling point at time t, k being the preset window threshold.

In some embodiments, with round-by-round recursion of a sampling value prediction process, a prediction window of a linear prediction module slides correspondingly and gradually on a preset time series of multiple sampling points. In some embodiments, when t is greater than 16, for example, when a linear prediction module performs linear coding prediction on sampling point 18, the end point of a prediction window slides to sampling point 17, and a linear prediction module uses 16 sampling points from sampling point 17 to sampling point 2 as at least one historical sampling point at time t.

In some embodiments, an electronic device may, by a linear prediction module, at least one historical sampling point at time t corresponding to sampling point t, obtain n sub-prediction values corresponding to each historical sampling point at time t, as at least one historical sub-prediction value at time t, and perform linear coding prediction on a linear value of an audio signal at sampling point t according to the at least one historical sub-prediction value at time t, to obtain n sub-rough prediction values at time t corresponding to sampling point t.

In some embodiments, for a first sampling point in the current frame, since there is no sub-prediction value on a historical sampling point corresponding to the first sampling point for reference, an electronic device may perform linear coding prediction on the first sampling point, that is, sampling point t of i=1, t=1, by combining preset linear prediction parameters, to obtain n sub-rough prediction values at time t corresponding to the first sampling point.

S1042: When i is greater than 1, based on a historical prediction result corresponding to the (i−1)th prediction process, and combined with conditional features, by 2n fully connected layers, synchronously perform forward residual prediction on residuals of sampling point t and residuals of sampling point t+1 on each subframe of n subframes respectively, to obtain n residuals at time t corresponding to sampling point t and n residuals at time t+1 corresponding to sampling point t+1, the historical prediction result including n residuals and n sub-prediction values corresponding to each of two adjacent sampling points in the (i−1)th prediction process.

In some embodiments, when i is greater than 1, an electronic device may obtain the prediction result of the last prediction process before the ith prediction process as the excitation of the ith prediction process, and perform prediction of a nonlinear error value of an audio signal by a sampling prediction network.

In some embodiments, a historical prediction result includes n residuals and n sub-prediction values corresponding to each of two adjacent sampling points in the (i−1)th prediction process. Based on the (i−1)th historical prediction result, and combined with conditional features, by 2n fully connected layers, an electronic device may perform forward residual prediction synchronously on residuals corresponding to sampling point t and sampling point t+1 on n subframes respectively, to obtain n residuals at time t corresponding to sampling point t and n residuals at time t+1 corresponding to sampling point t+1.

Figure 10:
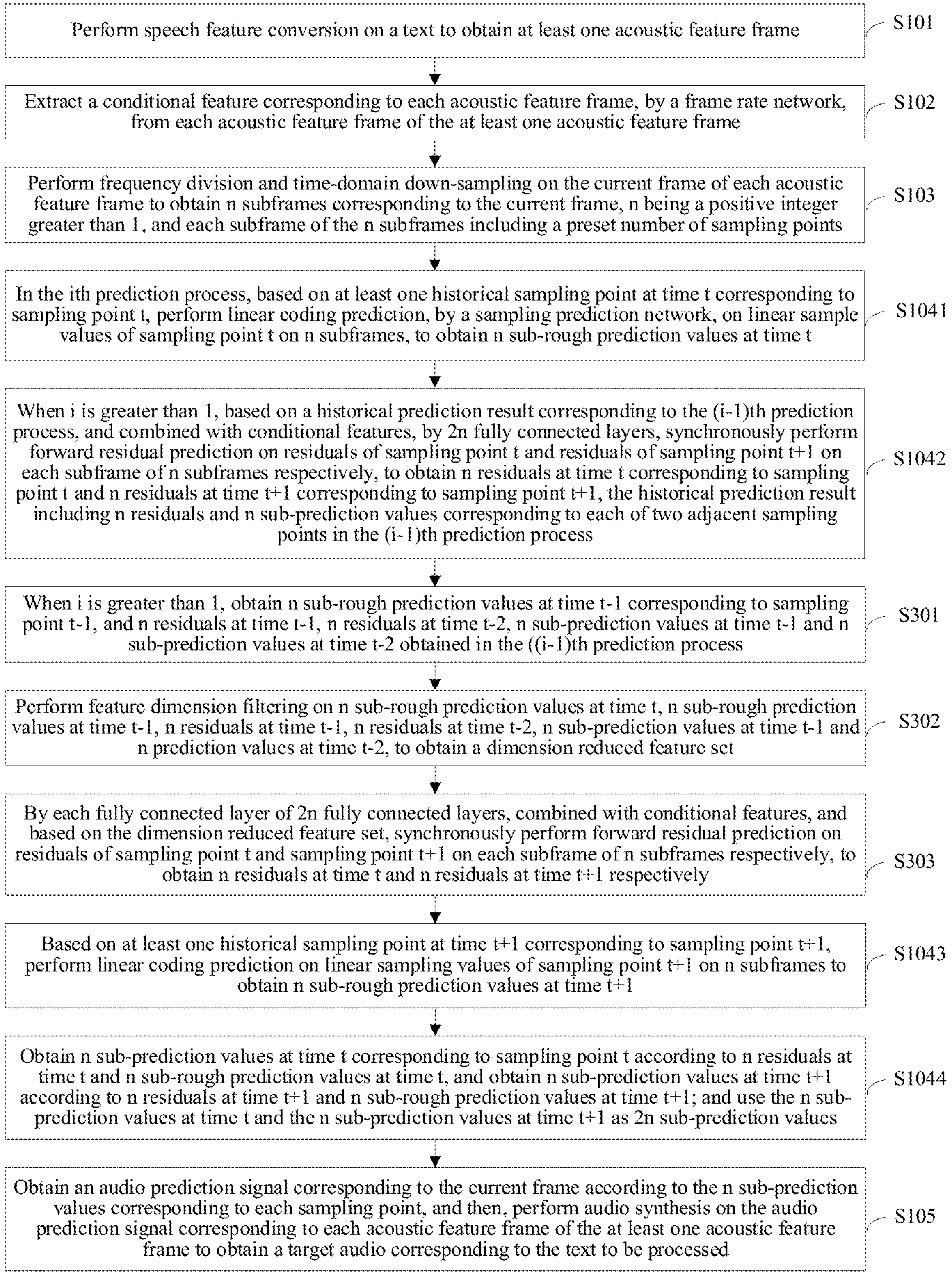
FIG. 10 is a schematic flow diagram 3 of an audio processing method provided by an embodiment of this application.

In some embodiments, as shown in FIG. 10, S1042 may be implemented by S301-S303, which will be described below.

S301: When i is greater than 1, obtain n sub-rough prediction values at time t−1 corresponding to sampling point t−1, and n residuals at time t−1, n residuals at time t−2, n sub-prediction values at time t−1 and n sub-prediction values at time t−2 obtained in the ((i−1)th prediction process.

In some embodiments, when i is greater than 1, with respect to the current time tin the ith prediction process, the sampling points processed in the (i−1)th prediction process are sampling point t−2 and sampling point t−1, and a historical prediction result that may be obtained in the (i−1)th prediction process of a sampling prediction network includes: n sub-rough prediction values at time t−2, n residuals at time t−2 and n sub-prediction values at time t−2 corresponding to sampling point t−2, as well as n rough prediction values at time t−1, n residuals at time t−1 and n sub-prediction values at time t−1 corresponding to sampling point t−1. From the historical prediction result corresponding to the (i−1)th prediction process, the sampling prediction network obtains n sub-rough prediction values at time t−1, as well as n residuals at time t−1, n residuals at time t−2, n sub-prediction values at time t−1, and n sub-prediction values at time t−2, to predict sampling values at sampling point t and sampling point t+1 in the ith prediction process based on the above data.

S302: Perform feature dimension filtering on n sub-rough prediction values at time t, n sub-rough prediction values at time t−1, n residuals at time t−1, n residuals at time t−2, n sub-prediction values at time t−1 and n prediction values at time t−2, to obtain a dimension reduced feature set.

In some embodiments, to reduce the complexity of network operations, a sampling prediction network needs to perform dimension reduction on feature data to be processed, to remove feature data on dimensions having less influence on a prediction result, thereby improving the network operation efficiency.

In some embodiments, a sampling prediction network includes a first gated recurrent network and a second gated recurrent network. S302 may be implemented by S3021-S3023, which will be described below.

S3021: Merge n sub-rough prediction values at time t, n sub-rough prediction values at time t−1, n residuals at time t−1, n residuals at time t−2, n sub-prediction values at time t−1 and n prediction values at time t−2 with respect to feature dimensions to obtain an initial feature vector set.

In some embodiments, an electronic device merges n sub-rough prediction values at time t, n sub-rough prediction values at time t−1, n residuals at time t−1, n residuals at time t−2, n sub-prediction values at time t−1 and n prediction values at time t−2 with respect to feature dimensions to obtain a set of total dimensions of information features used for residual prediction, as an initial feature vector.

S3022: Perform feature dimension reduction on the initial feature vector set based on conditional features, by a first gated recurrent network, to obtain an intermediate feature vector set.

In some embodiments, a first gated recurrent network may perform weight analysis on feature vectors of different dimensions, and based on the result of weight analysis, retain feature data on dimensions that are important and valid for residual prediction, and forget feature data on invalid dimensions, to implement dimension reduction on the initial feature vector set and obtain an intermediate feature vector set.

In some embodiments, a gated recurrent network may be a GRU network or an LSTM network, which is specifically selected according to the actual situation, and not limited in some embodiments.

S3023: Perform feature dimension reduction on the intermediate feature vector based on the conditional feature, by a second gated recurrent network, to obtain a dimension reduced feature set.

In some embodiments, an electronic device performs dimension reduction on the intermediate feature vector by the second gated recurrent network based on conditional features, to remove redundant information and reduce the workload of the subsequent prediction process.

S303: By each fully connected layer of 2n fully connected layers, combined with conditional features, and based on the dimension reduced feature set, synchronously perform forward residual prediction on residuals of sampling point t and sampling point t+1 on each subframe of n subframes respectively, to obtain n residuals at time t and n residuals at time t+1 respectively.

In some embodiments, based on FIG. 10, as shown in FIG. 11, S303 may be implemented by performing S3031-S3033, which will be described below.

S3031: Determine n dimension reduction residuals at time t−2 and n dimension reduced prediction values at time t−2 in the dimension reduced feature set as excitation values at time t, the n dimension reduction residuals at time t−2 being obtained by performing feature dimension filtering on n residuals at time t−2, and the n dimension reduced prediction values at time t−2 being obtained by performing feature dimension filtering on n prediction values at time t−2.

In some embodiments, an electronic device may use n dimension reduction residuals at time t−2 and n dimension reduced prediction values at time t−2 obtained in the (i−1)th prediction process as a vocal tract excitation of the ith prediction process, to predict residuals at time t by the forward prediction ability of a sample rate network.

S3032: Determine n dimension reduction residuals at time t−1 and n dimension reduced prediction values at time t−1 in the dimension reduced feature set as excitation values at time t+1, the n dimension reduction residuals at time t−1 being obtained by performing feature dimension filtering on n residuals at time t−1, and the n dimension reduced prediction values at time t−1 being obtained by performing feature dimension filtering on n prediction values at time t−1.

In some embodiments, an electronic device may use n dimension reduction residuals at time t−2 and n dimension reduced prediction values at time t−2 obtained in the (i−1)th prediction process as a vocal tract excitation of the ith prediction process, to predict residuals at time t by the forward prediction ability of a sample rate network.

S3033: In n fully connected layers of 2n fully connected layers, based on conditional features and excitation values at time t, by each fully connected layer in the n fully connected layers, perform forward residual prediction on sampling point t according to n dimension reduced sub-rough prediction values at time t−1 to obtain n residuals at time t; and in the other n fully connected layers of the 2n fully connected layers, based on conditional features and excitation values at time t+1, by each fully connected layer in the other n fully connected layers, perform forward residual prediction on sampling point t+1 according to n dimension reduced sub-rough prediction values at time t, to obtain n residuals at time t+1.

In some embodiments, 2n fully connected layers work simultaneously and independently, where n fully connected layers are configured to perform the correlation prediction process of sampling point t. In some embodiments, each fully connected layer of the n fully connected layers performs residual prediction of sampling point t on each subframe of n subframes; and according to dimension reduced sub-rough prediction values at time t−1 on a subframe, and combined with conditional features and excitation values at time t on the subframe (that is, dimension reduction residuals at time t−2 and dimension reduced prediction values at time t−2 corresponding to the subframe in n dimension reduction residuals at time t−2 and n dimension reduced prediction values at time t−2), residuals of sampling point t on the subframe is predicted, and then residuals of sampling point t on each subframe, that is, n residuals at time t, are obtained by n fully connected layers.

Meanwhile, similar to the above process, the other n fully connected layers of the 2n fully connected layers perform residual prediction of sampling point t on each subframe of n subframes; and according to dimension reduced sub-rough prediction values at time t on a subframe, and combined with conditional features and excitation values at time t+1 on the subframe (that is, dimension reduction residuals at time t−1 and dimension reduced prediction values at time t−1 corresponding to the subframe in n dimension reduction residuals at time t−1 and n dimension reduced prediction values at time t−1), residuals of sampling point t+1 on the subframe is predicted, and then residuals of sampling point t+1 on each subframe, that is, n residuals at time t+1, are obtained by the other n fully connected layers.

S1043: Based on at least one historical sampling point at time t+1 corresponding to sampling point t+1, perform linear coding prediction on linear sampling values of sampling point t+1 on n subframes to obtain n sub-rough prediction values at time t+1.

In some embodiments, S1043 is a linear prediction process when a prediction window of a linear prediction algorithm slides to sampling point t+1; and an electronic device may obtain at least one historical sub-prediction value at time t+1 corresponding to sampling point t+1 by a process similar to S1041, and perform linear coding prediction on linear sampling values corresponding to sampling point t+1 according to the at least one historical sub-prediction value at time t+1, to obtain n sub-rough prediction values at time t+1.

S1044: Obtain n sub-prediction values at time t corresponding to sampling point t according to n residuals at time t and n sub-rough prediction values at time t, and obtain n sub-prediction values at time t+1 according to n residuals at time t+1 and n sub-rough prediction values at time t+1; and use the n sub-prediction values at time t and the n sub-prediction values at time t+1 as 2n sub-prediction values.

In some embodiments, for sampling point t, by combining each subframe in n subframes, an electronic device may, by means of superposition of signals, superpose the signal amplitudes of n sub-rough prediction values at time t, which represents the linear information of an audio signal, and n residuals at time t, which represents the nonlinear random noise information, to obtain n sub-prediction values at time t corresponding to sampling point t.

Similarly, the electronic device may perform superposition of signals on n residuals at time t+1 and n sub-rough prediction values at time t+1 to obtain n sub-prediction values at time t+1. The electronic device further uses the n sub-prediction values at time t and the n sub-prediction values at time t+1 as 2n sub-prediction values.

Figure 12:
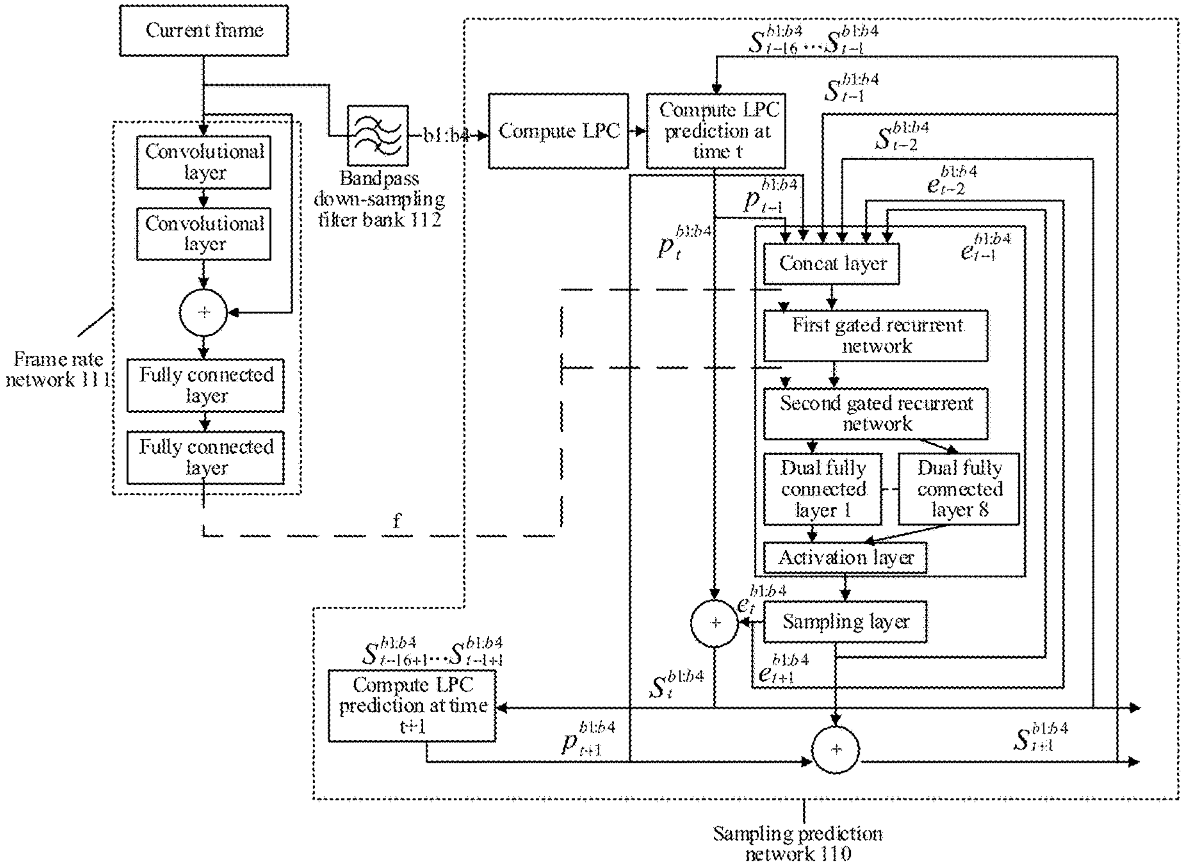
FIG. 12 is a schematic diagram of a network architecture of a frame rate network and a sampling prediction network provided by an embodiment of this application.

In some embodiments, based on the above-mentioned method and flows in FIGS. 8-11, a network architectural diagram of a frame rate network and a sampling prediction network in an electronic device may be as shown in FIG. 12. The sampling prediction network contains m×n dual fully connected layers, configured to predict sample values of m sampling points in the time domain in one prediction process, on each subframe of n subframes in the frequency domain. Taking n=4, m=2 as an example, dual fully connected layer 1 to dual fully connected layer 8 are 2×4 independent fully connected layers included in the sampling prediction network 110. The frame rate network 111 may extract a conditional feature f from the current frame by two convolutional layers and two fully connected layers. A bandpass down-sampling filter bank 112 performs frequency-domain division and time-domain down-sampling on the current frame, and obtains b1-b4 4 subframes, each subframe containing 40 sampling points correspondingly in the time domain.

In FIG. 12, the sampling prediction network 110 may predict sampling values of 40 sampling points in the time domain by multiple self-recursive cyclic prediction processes. For the ith prediction process of the multiple prediction processes, the sampling prediction network 110 may, by computation of an LPC coefficient and computation of LPC prediction values at time t, according to at least one historical sub-prediction value $S_{t-16}^{b1:b4} \ldots S_{t-1}^{b1:b4}$ corresponding to at least one historical sampling point at time t, obtain n sub-rough prediction values $p_t^{b1:b4}$ at time t corresponding to sampling point t at the current time, and then obtain n sub-rough prediction values $p_{t-1}^{b1:b4}$ at time t−1, n sub-prediction values $S_{t-2}^{b1:b4}$ at time t−2, n residuals $e_{t-2}^{b1:b4}$ at time t−2, n sub-prediction values $S_{t-1}^{b1:b4}$ at time t−1, and n residuals $e_{t-1}^{b1:b4}$ at time t−1 corresponding to the (i−1)th prediction process, which are sent to a merge layer together with $p_t^{b1:b4}$ to perform feature dimension merge, to obtain an initial feature vector set. The sampling prediction network 110 performs dimension reduction on the initial feature vector set by a first gated recurrent network and a second gated recurrent network in combination with the conditional feature f to obtain a dimension reduced feature set for performing prediction. Then, the dimension reduced feature set is respectively sent to 8 dual connected layers, and n residuals corresponding to sampling point t are predicted by 4 of the 8 dual connected layers, to obtain 4 residuals $e_t^{b1:b4}$ corresponding to sampling point t on 4 subframes. Meanwhile, by the other 4 dual connected layers, 4 residuals corresponding to sampling point t+1 are predicted, to obtain 4 residuals $e_{t+1}^{b1:b4}$ corresponding to sampling point t+1 on four subframes. The sampling prediction network 110 may further obtain 4 sub-prediction values $S_t^{b1:b4}$ corresponding to sampling point t on 4 subframes according to $e_t^{b1:b4}$ and $p_t^{b1:b4}$, obtain at least one historical sub-prediction value $S_{t-16}^{b1:b4} \ldots S_{t-1+1}^{b1:b4}$ at time t+1 corresponding to sampling point t+1 according to $S_t^{b1:b4}$, and obtain 4 sub-rough prediction values $p_{t+1}^{b1:b4}$ corresponding to sampling point t+1 on 4 subframes by computation of LPC prediction values at time t+1. The sampling prediction network 110 obtains 4 sub-prediction values $S_{t+1}^{b1:b4}$ corresponding to sampling point t+1 on 4 subframes according to $p_{t+1}^{b1:b4}$ and $e_{t+1}^{b1:b4}$, thereby completing the ith prediction process, update sampling point t and sampling point t+1 in the next prediction process, and perform cyclic prediction in the same way until all the 40 sampling points in the time domain are predicted, to obtain 4 sub-prediction values corresponding to each sampling point.

In the above embodiments, the method according to some embodiments reduces the number of loops of a sampling prediction network from the current 160 to 160/4 (number of subframes)/2 (number of adjacent sampling points), that is, 20, such that the number of processing loops of the sampling prediction network is greatly reduced, and the speed and efficiency of audio processing are improved.

In some embodiments, when m is set to another value, the number of dual fully connected layers in the sampling prediction network 110 needs to be set to m×n correspondingly, and in a prediction process, the forward prediction time span for each sampling point is m, that is, during prediction of residuals for each sampling point, the historical prediction results of the last m sampling points corresponding to the sampling point in the last prediction process are used as excitation values for performing residual prediction.

In some embodiments of this application, based on FIGS. 8-11, S1045-1047 may be performed following S1041, which will be described below.

S1045: When i equals to 1, by 2n fully connected layers, combined with conditional features and preset excitation parameters, perform forward residual prediction on sampling point t and sampling point t+1 simultaneously, to obtain n residuals at time t corresponding to sampling point t and n residuals at time t+1 corresponding to sampling point t+1.

In some embodiments, for the first prediction process, that is, i=1, since there is no historical prediction result of the last prediction process as an excitation value, by 2n fully connected layers, combined with conditional features and a preset excitation parameter, an electronic device may perform forward residual prediction on sampling point t and sampling point t+1 simultaneously, to obtain n residuals at time t corresponding to sampling point t and n residuals at time t+1 corresponding to sampling point t+1.

In some embodiments, a preset excitation parameter may be 0, or may be set to other values according to actual needs, which is specifically selected according to the actual situation, and not limited in some embodiments.

S1046: Based on at least one historical sampling point at time t+1 corresponding to sampling point t+1, perform linear coding prediction on linear sampling values corresponding to sampling point t+1 on n subframes, to obtain n sub-rough prediction values at time t+1.

In some embodiments, the process of S1046 is the same as described in S1043, and will not be repeated here.

S1047: Obtain n sub-prediction values at time t corresponding to sampling point t according to n residuals at time t and n sub-rough prediction values at time t, and obtain n sub-prediction values at time t+1 according to n residuals at time t+1 and n sub-rough prediction values at time t+1; and use the n sub-prediction values at time t and the n sub-prediction values at time t+1 as 2n sub-prediction values.

In some embodiments, the process of S1047 is the same as described in S1044, and will not be repeated here.

Figure 13:
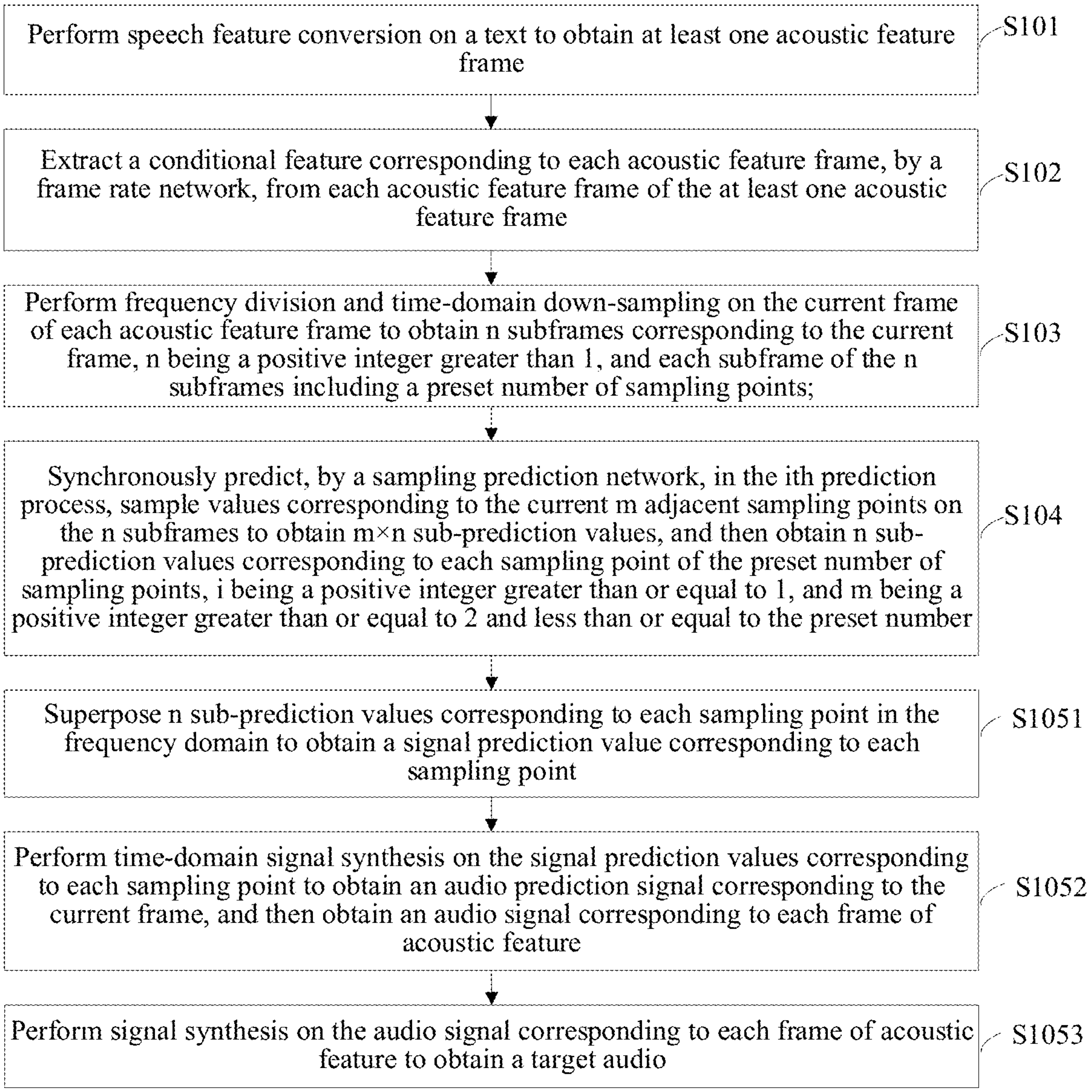
FIG. 13 is a schematic flow diagram 5 of an audio processing method provided by an embodiment of this application.

In some embodiments of this application, based on FIGS. 8-11, as shown in FIG. 13, S105 may be implemented by performing S1051-1053, which will be described below.

S1051: Superpose n sub-prediction values corresponding to each sampling point in the frequency domain to obtain a signal prediction value corresponding to each sampling point.

In some embodiments, since n sub-prediction values represent signal amplitudes in the frequency domain on each subframe at a sampling point, an electronic device may superpose the n sub-prediction values corresponding to each sampling point in the frequency domain by an inverse process of frequency-domain division, to obtain signal prediction values corresponding to each sampling point.

S1052: Perform time-domain signal synthesis on the signal prediction values corresponding to each sampling point to obtain an audio prediction signal corresponding to the current frame, and then obtain an audio signal corresponding to each frame of acoustic feature.

In some embodiments, since a preset number of sampling points are arranged in time series, an electronic device may perform signal synthesis in order on the signal prediction values corresponding to each sampling point in the time domain, to obtain an audio prediction signal corresponding to the current frame. By a cyclic processing, the electronic device may perform signal synthesis by taking each frame of acoustic feature of at least one acoustic feature frame as the current frame in each cyclic process, and then obtain an audio signal corresponding to each frame of acoustic feature.

S1053: Perform signal synthesis on the audio signal corresponding to each frame of acoustic feature to obtain a target audio.

In some embodiments, an electronic device performs signal synthesis on the audio signal corresponding to each frame of acoustic feature to obtain a target audio.

In some embodiments of this application, based on FIGS. 8-11 and FIG. 13, S101 may be implemented by performing S1011-S1013, which will be described below.

S1011: Acquire a text to be processed.

S1012: Preprocess the text to be processed to obtain text information to be converted.

In some embodiments, the preprocessing of the text has a very important influence on the quality of the target audio finally generated. The text to be processed acquired by the electronic device, usually with spaces and punctuation characters, may produce different semantics in many contexts, and therefore may cause the text to be processed to be misread, or may cause some words to be skipped or repeated. Accordingly, the electronic device needs to preprocess the text to be processed first to normalize the information of the text to be processed.

In some embodiments, the preprocessing of a text to be processed by an electronic device may include: capitalizing all characters in the text to be processed; deleting all intermediate punctuation; ending each sentence with a uniform terminator, e.g., a period or a question mark; replacing spaces between words with special delimiters, etc., which is specifically selected according to the actual situation, and not limited in some embodiments.

S1013: Perform acoustic feature prediction on the text information to be converted by a text-to-speech conversion model to obtain at least one acoustic feature frame.

In some embodiments, the text-to-speech conversion model is a neural network model that has been trained and can convert text information into acoustic features. The electronic device uses the text-to-speech conversion model to correspondingly convert at least one text sequence in the text information to be converted into at least one acoustic feature frame, thereby implementing acoustic feature prediction of the text information to be converted.

In some embodiments, by preprocessing the text to be processed, the audio quality of the target audio may be improved. In addition, the electronic device may use the most original text to be processed as input data, and output the final data processing result of the text to be processed, that is, the target audio, by the audio processing method in some embodiments, thereby implementing end-to-end processing of the text to be processed, reducing transition processing between system modules, and improving the overall fit.

An application of some embodiments in a practical application scenario will be described below.

Figure 14:
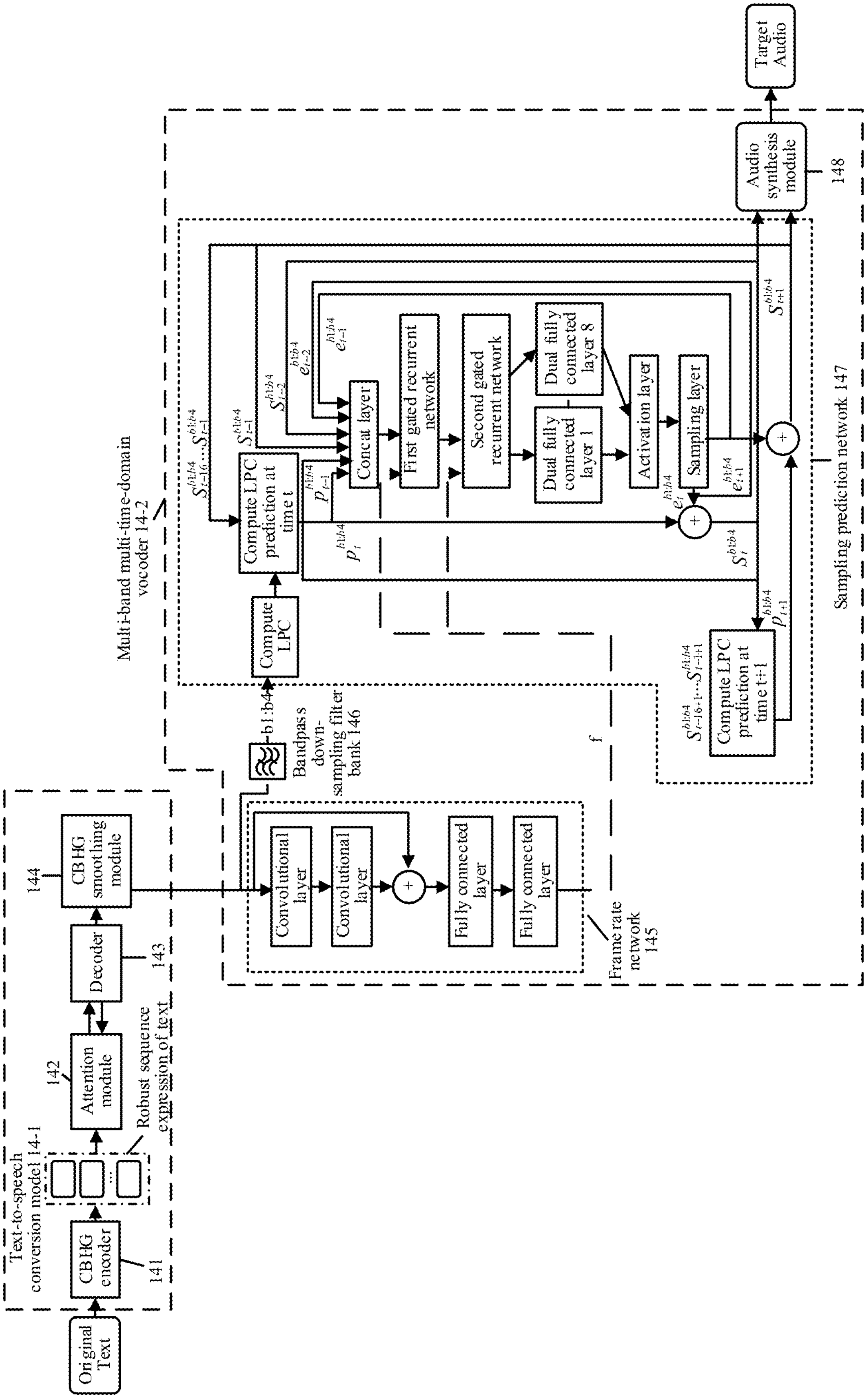
FIG. 14 is a schematic structural diagram of an electronic device provided by an embodiment of this application applied to a real life scenario.

Referring to FIG. 14, an embodiment of this application provides an application of an electronic device, including a text-to-speech conversion model 14-1 and a multi-band multi-time-domain vocoder 14-2. The text-to-speech model 14-1 uses a sequence-to-sequence Tacotron structure model with an attention mechanism, including a CBHG (1-D Convolution Bank Highway network bidirectional GRU) encoder 141, an attention module 142, a decoder 143 and a CBHG smoothing module 144. The CBHG encoder 141 is configured to use sentences in the original text as sequences, extract robust sequence expressions from the sentences, and encode the robust sequence expressions into vectors capable of being mapped to a fixed length. The attention module 142 is configured to pay attention to all words of the robust sequence expressions, and assist the encoder to perform better encoding by computing an attention score. The decoder 143 is configured to map the fixed-length vector obtained by the encoder into an acoustic feature of the corresponding sequence, and output a smoother acoustic feature by the CBHG smoothing module 144, thereby obtaining at least one acoustic feature frame. The at least one acoustic feature frame enters the multi-band multi-time-domain vocoder 14-2, and computes a conditional feature f of each frame by the frame rate network 145 in the multi-band multi-time-domain vocoder. Meanwhile, each acoustic feature frame is divided into 4 subframes by a bandpass down-sampling filter bank 146, and after each subframe is down-sampled in the time domain, the 4 subframes enter a self-recursive sampling prediction network 147. In the sampling prediction network 147, by LPC coefficient computation (Compute LPC) and LPC current prediction value computation (Compute prediction), the linear prediction values of a sampling point t at the current time t on 4 subframes in the current process are predicted to obtain 4 sub-rough prediction values $p_t^{b1:b4}$ at time t. In addition, the sampling prediction network 147 takes two sampling points in each process as a forward predictive step, and from a historical prediction result of the previous prediction, obtains 4 sub-prediction values corresponding to sampling point t−1 on the 4 subframes, sub-rough prediction values $p_{t-1}^{b1:b4}$ of sampling point t−1 on the 4 subframes, residuals of sampling point t−1 on the 4 subframes, sub-prediction values $S_{t-2}^{b1:b4}$ of sampling point t−2 on the 4 subframes, and residuals $e_{t-2}^{b1:b4}$ of sampling point t−2 on the 4 subframes, which are combined with the conditional feature f and sent to a merge layer (concat layer) in the sampling prediction network for feature dimension merge to obtain an initial feature vector. The initial feature vector is then subjected to feature dimension reduction by a 90% sparse 384-dimensional first gated recurrent network (GRU-A) and a normal 16-dimensional second gated recurrent network (GRU-B) to obtain a dimension reduced feature set. The sampling prediction network 147 sends the dimension reduced feature set into 8 256-dimensional dual fully connected (dual FC) layers, and by the 8 256-dimensional dual FC layers, combined with the conditional feature f, and based on $S_{t-2}^{b1:b4}$, $e_{t-2}^{b1:b4}$ and $p_{t-1}^{b1:b4}$, sub-residuals $e_t^{b1:b4}$ of sampling point t on the 4 subframes are predicted, and based on $S_{t-1}^{b1:b4}$, $e_{t-1}^{b1:b4}$ and $p_t^{b1:b4}$ sub-residuals $e_{t-1}^{b1:b4}$ of sampling point t+1 on the 4 subframes are predicted. The sampling prediction network 147 may obtain sub-prediction values $S_t^{b1:b4}$ of sampling point t on the 4 subframes by superposing $p_t^{b1:b4}$ and $e_t^{b1:b4}$, such that the sampling prediction network 147 may predict sub-rough prediction values $p_{t-1}^{b1:b4}$ corresponding to sampling point t+1 on the 4 subframes by sliding of a prediction window according to $S_t^{b1:b4}$. The sampling prediction network 147 obtains 4 sub-prediction values $S_{t-1}^{b1:b4}$ corresponding to sampling point t+1 by superposing $p_{t+1}^{b1:b4}$ and $e_{t-1}^{b1:b4}$. The sampling prediction network 147 uses $e_t^{b1:b4}$, $e_{t-1}^{b1:b4}$, $S_t^{b1:b4}$, and $S_{t-1}^{b1:b4}$ as excitation values for the next process, i.e., the (i+1)th prediction process, and updates the current two adjacent sampling points corresponding to the next prediction process for performing cyclic processing, until 4 sub-prediction values of the acoustic feature frame at each sampling point are obtained. The multi-band multi-time-domain vocoder 14-2 merges the 4 sub-prediction values at each sampling point in the frequency domain by the audio synthesis module 148 to obtain an audio signal at each sampling point, and merges the audio signals on each sampling point in the time domain to obtain the audio signal corresponding to the frame by the audio synthesis module 148. The audio synthesis module 148 merges the audio signals corresponding to each frame of the at least one acoustic feature frame to obtain an audio corresponding to the at least one acoustic feature frame, that is, the target audio corresponding to the original text initially input to the electronic device.

In the structure of the electronic device provided by some embodiments, although 7 dual fully connected layers are added, and an input matrix of a GRU-A layer will become larger, the influence of the input overhead is negligible by a table lookup operation; and compared with the traditional vocoders, a multi-band multi-time domain policy reduces the number of cycles required for self-recursion of the sampling prediction network by 8 times. Thus, without other computational optimizations, the speed of the vocoder is improved by 2.75 times. Moreover, experimenters are recruited for subjective quality scoring, and the target audio synthesized by the electronic device of this application only decreases by 3% in subjective quality scoring. Therefore, the speed and efficiency of audio processing are improved while the quality of audio processing is unaffected.

A structure of an audio processing apparatus 655 provided by an embodiment of this application, implemented as software modules, will be described below. In some embodiments, as shown in FIG. 6, software modules in the audio processing apparatus 655 stored in a memory 650 may include:

- a text-to-speech conversion model 6551, configured to perform speech feature conversion on a text to be processed to obtain at least one acoustic feature frame;
- a frame rate network 6552, configured to extract a conditional feature corresponding to each acoustic feature frame, from each acoustic feature frame of the at least one acoustic feature frame;
- a time domain-frequency domain processing module 6553, configured to perform frequency division and time-domain down-sampling on the current frame of each acoustic feature frame to obtain n subframes corresponding to the current frame, n being a positive integer greater than 1, and each subframe of the n subframes including a preset number of sampling points;
- a sampling prediction network 6554, configured to synchronously predict, in the ith prediction process, sample values corresponding to the current m adjacent sampling points on the n subframes to obtain m×n sub-prediction values, and then obtain n sub-prediction values corresponding to each sampling point of the preset number of sampling points, i being a positive integer greater than or equal to 1, and m being a positive integer greater than or equal to 2 and less than or equal to the preset number; and
- a signal synthesis module 6555, configured to obtain an audio prediction signal corresponding to the current frame according to the n sub-prediction values corresponding to each sampling point, and then, perform audio synthesis on the audio prediction signal corresponding to each acoustic feature frame of the at least one acoustic feature frame to obtain a target audio corresponding to the text to be processed.

In some embodiments, when m equals to 2, the sampling prediction network includes 2n independent fully connected layers, and the adjacent two sampling points include: in the ith prediction process, sampling point t corresponding to the current time t and sampling point t+1 corresponding to the next time t+1, t being a positive integer greater than or equal to 1.

The sampling prediction network 6554 is further configured to in the ith prediction process, based on at least one historical sampling point at time t corresponding to the sampling point t, perform linear coding prediction on linear sample values of the sampling point t on the n subframes, to obtain n sub-rough prediction values at time t; when i is greater than 1, based on a historical prediction result corresponding to the (i−1)th prediction process, and combined with the conditional features, by 2n fully connected layers, perform forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, the historical prediction result including n residuals and n sub-prediction values corresponding to each of the two adjacent sampling points in the (i−1)th prediction process; based on at least one historical sampling point at time t+1 corresponding to the sampling point t+1, perform linear coding prediction on linear sampling values of the sampling point t+1 on the n subframes to obtain n sub-rough prediction values at time t+1; obtain n sub-prediction values at time t corresponding to the sampling point t according to the n residuals at time t and the n sub-rough prediction values at time t, and obtain n sub-prediction values at time t+1 according to the n residuals at time t+1 and the n sub-rough prediction values at time t+1; and use the n sub-prediction values at time t and the n sub-prediction values at time t+1 as 2n sub-prediction values.

In some embodiments, the sampling prediction network 6554 is further configured to obtain n sub-rough prediction values at time t−1 corresponding to sampling point t−1, as well as n residuals at time t−1, n residuals at time t−2, n sub-prediction values at time t−1 and n prediction values at time t−2 in the (i−1)th prediction process; perform feature dimension filtering on the n sub-rough prediction values at time t, the n sub-rough prediction values at time t−1, the n residuals at time t−1, the n residuals at time t−2, the n sub-prediction values at time t−1 and the n prediction values at time t−2, to obtain a dimension reduced feature set; and by each fully connected layer of the 2n fully connected layers, combined with the conditional features, and based on the dimension reduced feature set, synchronously perform forward residual prediction on residuals of the sampling point t and the sampling point t+1 on each subframe of the n subframes respectively, to obtain n residuals at time t and n residuals at time t+1 respectively.

In some embodiments, the sampling prediction network 6554 is further configured to determine n dimension reduction residuals at time t−2 and n dimension reduced prediction values at time t−2 in the dimension reduced feature set as excitation values at time t, the n dimension reduction residuals at time t−2 being obtained by performing feature dimension filtering on the n residuals at time t−2, and the n dimension reduced prediction values at time t−2 being obtained by performing feature dimension filtering on the n prediction values at time t−2; determine n dimension reduction residuals at time t−1 and n dimension reduced prediction values at time t−1 in the dimension reduced feature set as excitation values at time t+1, the n dimension reduction residuals at time t−1 being obtained by performing feature dimension filtering on the n residuals at time t−1, and the n dimension reduced prediction values at time t−1 being obtained by performing feature dimension filtering on the n prediction values at time t−1; in n fully connected layers of 2n fully connected layers, based on the conditional features and the excitation values at time t, by each fully connected layer in the n fully connected layers, perform forward residual prediction on the sampling point t according to the n dimension reduced sub-rough prediction values at time t−1 to obtain n residuals at time t; and in the other n fully connected layers of the 2n fully connected layers, based on the conditional features and the excitation values at time t+1, by each fully connected layer in the other n fully connected layers, perform forward residual prediction on the sampling point t+1 according to the n dimension reduced sub-rough prediction values at time t, to obtain n residuals at time t+1.

In some embodiments, the sampling prediction network includes a first gated recurrent network and a second gated recurrent network. The sampling prediction network 6554 is further configured to perform feature dimension merge on the n sub-rough prediction values at time t, the n sub-rough prediction values at time t−1, the n residuals at time t−1, the n residuals at time t−2, the n sub-prediction values at time t−1, and the n prediction values at time t−2 to obtain an initial feature vector set; based on the conditional features, perform feature dimension reduction on the initial feature vector set by the first gated recurrent network to obtain an intermediate feature vector set; and based on the conditional features, perform feature dimension reduction on the intermediate feature vector set by the second gated recurrent network to obtain the dimension reduced feature set.

In some embodiments, the time domain-frequency domain processing module 6553 is further configured to perform frequency-domain division on the current frame to obtain n initial subframes; and down-sample the time-domain sampling points corresponding to the n initial subframes to obtain the n subframes.

In some embodiments, the sampling prediction network 6554 is further configured to, before in the ith prediction process, based on at least one historical sampling point at time t corresponding to the sampling point t, performing linear coding prediction on linear sample values of the sampling point t on the n subframes, to obtain n sub-rough prediction values at time t, when t is less than or equal to a preset window threshold, use all sampling points before the sampling point t as the at least one historical sampling point at time t, the preset window threshold representing the maximum quantity of sampling points processible by linear coding prediction; or when t is greater than the preset window threshold, use sampling points in a range of the sampling point t−1 to sampling point t−k, as the at least one historical sampling point at time t, k being the preset window threshold.

In some embodiments, the sampling prediction network 6554 is further configured to, after in the ith prediction process, based on at least one historical sampling point at time t corresponding to the sampling point t, performing linear coding prediction on linear sample values of the sampling point t on the n subframes, to obtain n sub-rough prediction values at time t, when i equals to 1, by the 2n fully connected layers, combined with the conditional features and preset excitation parameters, perform forward residual prediction on residuals of the sampling point t and the sampling point t+1 on the n subframes synchronously, to obtain n residuals at time t corresponding to the sampling point t and n residuals at time t+1 corresponding to the sampling point t+1; perform based on at least one historical sampling point at time t+1 corresponding to the sampling point t+1, linear coding prediction on linear sampling values of the sampling point t+1 on the n subframes to obtain n sub-rough prediction values at time t+1; obtain n sub-prediction values at time t corresponding to the sampling point t according to the n residuals at time t and the n sub-rough prediction values at time t, and n sub-prediction values at time t+1 are obtained according to the n residuals at time t+1 and the n sub-rough prediction values at time t+1; and use the n sub-prediction values at time t and the n sub-prediction values at time t+1 as the 2n sub-prediction values.

In some embodiments, the signal synthesis module 6555 is further configured to superpose the n sub-prediction values corresponding to each sampling point in the frequency domain to obtain a signal prediction value corresponding to each sampling point; perform time-domain signal synthesis on the signal prediction values corresponding to each sampling point to obtain an audio prediction signal corresponding to the current frame, and then obtain an audio signal corresponding to each frame of acoustic feature; performing signal synthesis on the audio signal corresponding to each frame of acoustic feature to obtain the target audio.

In some embodiments, the text-to-speech conversion model 6551 is further configured to obtain a text to be processed; preprocess the text to be processed to obtain text information to be converted; and perform acoustic feature prediction on the text information to be converted by the text-to-speech conversion model to obtain the at least one acoustic feature frame.

The description of the apparatus embodiments is similar to the description of the method embodiments, and has beneficial effects similar to the method embodiments. Refer to descriptions in the method embodiments of this application for technical details undisclosed in the apparatus embodiments of this application.

According to an aspect of some embodiments, a computer program product or a computer program is provided, including computer instructions, the computer instructions being stored in a computer-readable storage medium. A processor of a computer device reads the computer instructions from the computer-readable storage medium, and executes the computer instructions, to cause the computer device to perform the foregoing audio processing method in some embodiments.

An embodiment of this application provides a storage medium storing executable instructions, that is a computer-readable storage medium. When the executable instructions are executed by a processor, the processor is caused to perform the methods provided in some embodiments, for example, the methods shown in FIG. 8 to FIG. 11 and FIG. 13.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In one embodiment, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In one embodiment, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In summary, in some embodiments, by preprocessing the text to be processed, the audio quality of the target audio may be improved. In addition, the most original text to be processed may be used as input data, and the final data processing result of the text to be processed, that is, the target audio, may be outputted by the audio processing method in some embodiments, thereby implementing end-to-end processing of the text to be processed, reducing transition processing between system modules, and improving the overall fit. Moreover, in some embodiments, the acoustic feature signal of each frame is divided into multiple subframes in the frequency domain and each subframe is down-sampled, such that the total number of sampling points to be processed during prediction of sample values by the sampling prediction network is reduced. Further, by simultaneously predicting multiple sampling points at adjacent times in one prediction process, synchronous processing of multiple sampling points is implemented, thereby significantly reducing the number of loops required for prediction of the audio signal by the sampling prediction network, improving the processing speed of audio synthesis, and improving the efficiency of audio processing.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL APPLICABILITY

In some embodiments, the acoustic feature signal of each frame is divided into multiple subframes in the frequency domain and each subframe is down-sampled, such that the total number of sampling points to be processed during prediction of sample values by the sampling prediction network is reduced. Further, by simultaneously predicting multiple sampling points at adjacent times in one prediction process, synchronous processing of multiple sampling points is implemented, thereby significantly reducing the number of loops required for prediction of the audio signal by the sampling prediction network, improving the processing speed of audio synthesis, and improving the efficiency of audio processing. Further, by down-sampling each subframe in the time domain, redundant information in each subframe may be removed, and the number of processing loops required for performing recursive prediction by a sampling prediction network may be reduced, thereby further improving the speed and efficiency of audio processing. Further, by preprocessing the text to be processed, the audio quality of the target audio may be improved. In addition, the most original text to be processed may be used as input data, and the final data processing result of the text to be processed, that is, the target audio, may be outputted by the audio processing method in some embodiments, thereby implementing end-to-end processing of the text to be processed, reducing transition processing between system modules, and improving the overall fit. Moreover, the vocoder provided by some embodiments effectively reduces the amount of computation required to convert acoustic features into audio signals, implements synchronous prediction of multiple sampling points, and may output audios that are highly intelligible, natural and with high fidelity while maintaining a high real-time rate.

What is claimed is:

1. An audio processing method, executed by an electronic device, comprising:

performing speech feature conversion on a text to obtain at least one acoustic feature frame;

extracting a conditional feature corresponding to each acoustic feature frame from each acoustic feature frame of the at least one acoustic feature frame by a frame rate network;

performing frequency division and time-domain down-sampling on the current frame of each acoustic feature frame to obtain n subframes corresponding to the current frame, n being a positive integer greater than 1, and each subframe of the n subframes comprising a preset number of sampling points;

synchronously predicting, by a sampling prediction network, in an ith prediction process, sample values corresponding to current m adjacent sampling points on the n subframes to obtain m×n sub-prediction values, and obtain n sub-prediction values corresponding to each sampling point of the preset number of sampling points, i being a positive integer greater than or equal to 1, and m being a positive integer greater than or equal to 2 and less than or equal to the preset number;

obtaining an audio prediction signal corresponding to the current frame according to the n sub-prediction values corresponding to each sampling point; and performing audio synthesis on the audio prediction signal corresponding to each acoustic feature frame of the at least one acoustic feature frame to obtain a target audio corresponding to the text.

2. The method according to claim 1, wherein when m equals to 2, the sampling prediction network comprises 2n independent fully connected layers, and the two adjacent sampling points comprise: in the ith prediction process, sampling point t corresponding to the current time t and sampling point t+1 corresponding to the next time t+1, t being a positive integer greater than or equal to 1;

the synchronously predicting sample values corresponding to the current m adjacent sampling points on the n subframes to obtain m×n sub-prediction values, comprises:

in the ith prediction process, based on at least one historical sampling point at time t corresponding to the sampling point t, performing linear coding prediction, by the sampling prediction network, on linear sample values of the sampling point t on the n subframes, to obtain n sub-rough prediction values at time t;

when i is greater than 1, based on a historical prediction result corresponding to the (i−1)th prediction process, and combined with the conditional features, by 2n fully connected layers, performing forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, the historical prediction result comprising n residuals and n sub-prediction values corresponding to each of two adjacent sampling points in the (i−1)th prediction process;

performing linear coding prediction on linear sampling values of the sampling point t+1 on the n subframes to obtain n sub-rough prediction values at time t+1 based on at least one historical sampling point at time t+1 corresponding to the sampling point t+1;

obtaining n sub-prediction values at time t corresponding to the sampling point t according to the n residuals at time t and the n sub-rough prediction values at time t, and obtaining n sub-prediction values at time t+1 according to the n residuals at time t+1 and the n sub-rough prediction values at time t+1; and using the n sub-prediction values at time t and the n sub-prediction values at time t+1 as 2n sub-prediction values.

3. The method according to claim 2, wherein the based on a historical prediction result corresponding to the (i−1)th prediction process, and combined with the conditional features, by 2n fully connected layers, performing forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, comprises:

obtaining n sub-rough prediction values at time t−1 corresponding to the sampling point t−1, as well as n residuals at time t−1, n residuals at time t−2, n sub-prediction values at time t−1 and n prediction values at time t−2 in the (i−1)th prediction process;

performing feature dimension filtering on the n sub-rough prediction values at time t, the n sub-rough prediction values at time t−1, the n residuals at time t−1, the n residuals at time t−2, the n sub-prediction values at time t−1 and the n prediction values at time t−2, to obtain a dimension reduced feature set; and synchronously performing forward residual prediction on residuals of the sampling point t and the sampling point t+1 on each subframe of the n subframes respectively, by each fully connected layer of the 2n fully connected layers, combined with the conditional features, and based on the dimension reduced feature set, to obtain n residuals at time t and n residuals at time t+1 respectively.

4. The method according to claim 3, wherein the by each fully connected layer of the 2n fully connected layers, combined with the conditional features, and based on the dimension reduced feature set, synchronously performing forward residual prediction on residuals of the sampling point t and the sampling point t+1 on each subframe of the n subframes respectively, to obtain n residuals at time t and n residuals at time t+1 respectively, comprises:

determining n dimension reduction residuals at time t−2 and n dimension reduced prediction values at time t−2 in the dimension reduced feature set as excitation values at time t, the n dimension reduction residuals at time t−2 being obtained by performing feature dimension filtering on n residuals at time t−2, and the n dimension reduced prediction values at time t−2 being obtained by performing feature dimension filtering on n prediction values at time t−2;

determining the n dimension reduction residuals at time t−1 and the n dimension reduced prediction values at time t−1 in the dimension reduced feature set as excitation values at time t+1, the n dimension reduction residuals at time t−1 being obtained by performing feature dimension filtering on n residuals at time t−1, and the n dimension reduced prediction values at time t−1 being obtained by performing feature dimension filtering on n prediction values at time t−1;

performing forward residual prediction on the sampling point t according to the n dimension reduced sub-rough prediction values at time t−1 to obtain the n residuals at time t in n fully connected layers of the 2n fully connected layers, based on the conditional features and the excitation values at time t, by each fully connected layer in the n fully connected layers; and performing forward residual prediction on the sampling point t+1 according to the n dimension reduced sub-rough prediction values at time t, to obtain the n residuals at time t+1 in the other n fully connected layers of the 2n fully connected layers, based on the conditional features and the excitation values at time t+1, by each fully connected layer in the other n fully connected layers.

5. The method according to claim 3, wherein the sampling prediction network comprises a first gated recurrent network and a second gated recurrent network; and the performing feature dimension filtering on the n sub-rough prediction values at time t, the n sub-rough prediction values at time t−1, the n residuals at time t−1, the n residuals at time t−2, the n sub-prediction values at time t−1 and the n prediction values at time t−2, to obtain a dimension reduced feature set, comprises:

performing feature dimension merge on the n sub-rough prediction values at time t, the n sub-rough prediction values at time t−1, the n residuals at time t−1, the n residuals at time t−2, the n sub-prediction values at time t−1, and the n prediction values at time t−2 to obtain an initial feature vector set;

performing feature dimension reduction on the initial feature vector set by the first gated recurrent network to obtain an intermediate feature vector set based on the conditional features; and performing feature dimension reduction on the intermediate feature vector set by the second gated recurrent network to obtain the dimension reduced feature set based on the conditional features.

6. The method according to claim 2, further comprising:

when t is less than or equal to a preset window threshold, using all sampling points before the sampling point t as the at least one historical sampling point at time t, the preset window threshold representing the maximum quantity of sampling points processible by linear coding prediction; or when t is greater than the preset window threshold, using sampling points in a range of the sampling point t−1 to sampling point t−k, as the at least one historical sampling point at time t, k being the preset window threshold.

7. The method according to claim 2, further comprising:

when i is equal to 1, by 2n fully connected layers, combined with the conditional features and preset excitation parameters, performing forward residual prediction on residuals of the sampling point t and the sampling point t+1 on the n subframes synchronously, to obtain n residuals at time t corresponding to the sampling point t and n residuals at time t+1 corresponding to the sampling point t+1;

based on at least one historical sampling point at time t+1 corresponding to the sampling point t+1, performing linear coding prediction on linear sampling values of the sampling point t+1 on the n subframes to obtain n sub-rough prediction values at time t+1; and obtaining n sub-prediction values at time t corresponding to the sampling point t according to the n residuals at time t and the n sub-rough prediction values at time t, and obtaining n sub-prediction values at time t+1 according to the n residuals at time t+1 and the n sub-rough prediction values at time t+1; and using the n sub-prediction values at time t and the n sub-prediction values at time t+1 as the 2n sub-prediction values.

8. The method according to claim 1, wherein the performing frequency division and time-domain down-sampling on the current frame of each acoustic feature frame to obtain n subframes corresponding to the current frame, comprises:

performing frequency-domain division on the current frame to obtain n initial subframes; and down-sampling time-domain sampling points corresponding to the n initial subframes to obtain the n subframes.

9. The method according to claim 1, wherein the obtaining an audio prediction signal corresponding to the current frame according to the n sub-prediction values corresponding to each sampling point, and performing audio synthesis on the audio prediction signal corresponding to each acoustic feature frame of the at least one acoustic feature frame to obtain a target audio corresponding to the text, comprises:

superposing the n sub-prediction values corresponding to each sampling point in the frequency domain to obtain the signal prediction value corresponding to each sampling point;

performing time-domain signal synthesis on the signal prediction values corresponding to each sampling point to obtain an audio prediction signal corresponding to the current frame, and obtain an audio signal corresponding to each frame of acoustic feature; and performing signal synthesis on the audio signal corresponding to each frame of acoustic feature to obtain the target audio.

10. The method according to claim 1, wherein the performing speech feature conversion on a text to obtain at least one acoustic feature frame, comprises:

acquiring a text;

preprocessing the text to obtain text information; and performing acoustic feature prediction on the text information by a text-to-speech conversion model to obtain the at least one acoustic feature frame, sub-prediction-sub-predictionsub-predictionsub-predictionsub-predictionsub-prediction.

11. An electronic device, comprising:

a memory, configured to store executable instructions; and a processor, when executing the executable instructions stored in the memory, configured to implement:

performing speech feature conversion on a text to obtain at least one acoustic feature frame;

extracting a conditional feature corresponding to each acoustic feature frame from each acoustic feature frame of the at least one acoustic feature frame by a frame rate network;

performing frequency division and time-domain down-sampling on the current frame of each acoustic feature frame to obtain n subframes corresponding to the current frame, n being a positive integer greater than 1, and each subframe of the n subframes comprising a preset number of sampling points;

synchronously predicting, by a sampling prediction network, in an ith prediction process, sample values corresponding to current m adjacent sampling points on the n subframes to obtain m×n sub-prediction values, and obtain n sub-prediction values corresponding to each sampling point of the preset number of sampling points, i being a positive integer greater than or equal to 1, and m being a positive integer greater than or equal to 2 and less than or equal to the preset number;

obtaining an audio prediction signal corresponding to the current frame according to the n sub-prediction values corresponding to each sampling point; and performing audio synthesis on the audio prediction signal corresponding to each acoustic feature frame of the at least one acoustic feature frame to obtain a target audio corresponding to the text.

12. The electronic device according to claim 11, wherein when m equals to 2, the sampling prediction network comprises 2n independent fully connected layers, and the two adjacent sampling points comprise: in the ith prediction process, sampling point t corresponding to the current time t and sampling point t+1 corresponding to the next time t+1, t being a positive integer greater than or equal to 1;

the synchronously predicting sample values corresponding to the current m adjacent sampling points on the n subframes to obtain m×n sub-prediction values, comprises:

in the ith prediction process, based on at least one historical sampling point at time t corresponding to the sampling point t, performing linear coding prediction, by the sampling prediction network, on linear sample values of the sampling point t on the n subframes, to obtain n sub-rough prediction values at time t;

when i is greater than 1, based on a historical prediction result corresponding to the (i−1)th prediction process, and combined with the conditional features, by 2n fully connected layers, performing forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, the historical prediction result comprising n residuals and n sub-prediction values corresponding to each of two adjacent sampling points in the (i−1)th prediction process;

performing linear coding prediction on linear sampling values of the sampling point t+1 on the n subframes to obtain n sub-rough prediction values at time t+1 based on at least one historical sampling point at time t+1 corresponding to the sampling point t+1;

obtaining n sub-prediction values at time t corresponding to the sampling point t according to the n residuals at time t and the n sub-rough prediction values at time t, and obtaining n sub-prediction values at time t+1 according to the n residuals at time t+1 and the n sub-rough prediction values at time t+1; and using the n sub-prediction values at time t and the n sub-prediction values at time t+1 as 2n sub-prediction values.

13. The electronic device according to claim 12, wherein the based on a historical prediction result corresponding to the (i−1)th prediction process, and combined with the conditional features, by 2n fully connected layers, performing forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, comprises:

obtaining n sub-rough prediction values at time t−1 corresponding to the sampling point t−1, as well as n residuals at time t−1, n residuals at time t−2, n sub-prediction values at time t−1 and n prediction values at time t−2 in the (i−1)th prediction process;

performing feature dimension filtering on the n sub-rough prediction values at time t, the n sub-rough prediction values at time t−1, the n residuals at time t−1, the n residuals at time t−2, the n sub-prediction values at time t−1 and the n prediction values at time t−2, to obtain a dimension reduced feature set; and synchronously performing forward residual prediction on residuals of the sampling point t and the sampling point t+1 on each subframe of the n subframes respectively, by each fully connected layer of the 2n fully connected layers, combined with the conditional features, and based on the dimension reduced feature set, to obtain n residuals at time t and n residuals at time t+1 respectively.

14. The electronic device according to claim 13, wherein the by each fully connected layer of the 2n fully connected layers, combined with the conditional features, and based on the dimension reduced feature set, synchronously performing forward residual prediction on residuals of the sampling point t and the sampling point t+1 on each subframe of the n subframes respectively, to obtain n residuals at time t and n residuals at time t+1 respectively, comprises:

determining n dimension reduction residuals at time t−2 and n dimension reduced prediction values at time t−2 in the dimension reduced feature set as excitation values at time t, the n dimension reduction residuals at time t−2 being obtained by performing feature dimension filtering on n residuals at time t−2, and the n dimension reduced prediction values at time t−2 being obtained by performing feature dimension filtering on n prediction values at time t−2;

determining the n dimension reduction residuals at time t−1 and the n dimension reduced prediction values at time t−1 in the dimension reduced feature set as excitation values at time t+1, the n dimension reduction residuals at time t−1 being obtained by performing feature dimension filtering on n residuals at time t−1, and the n dimension reduced prediction values at time t−1 being obtained by performing feature dimension filtering on n prediction values at time t−1;

performing forward residual prediction on the sampling point t according to the n dimension reduced sub-rough prediction values at time t−1 to obtain the n residuals at time t in n fully connected layers of the 2n fully connected layers, based on the conditional features and the excitation values at time t, by each fully connected layer in the n fully connected layers; and performing forward residual prediction on the sampling point t+1 according to the n dimension reduced sub-rough prediction values at time t, to obtain the n residuals at time t+1 in the other n fully connected layers of the 2n fully connected layers, based on the conditional features and the excitation values at time t+1, by each fully connected layer in the other n fully connected layers.

15. The electronic device according to claim 13, wherein the sampling prediction network comprises a first gated recurrent network and a second gated recurrent network; and the performing feature dimension filtering on the n sub-rough prediction values at time t, the n sub-rough prediction values at time t−1, the n residuals at time t−1, the n residuals at time t−2, the n sub-prediction values at time t−1 and the n prediction values at time t−2, to obtain a dimension reduced feature set, comprises:

performing feature dimension merge on the n sub-rough prediction values at time t, the n sub-rough prediction values at time t−1, the n residuals at time t−1, the n residuals at time t−2, the n sub-prediction values at time t−1, and the n prediction values at time t−2 to obtain an initial feature vector set;

performing feature dimension reduction on the initial feature vector set by the first gated recurrent network to obtain an intermediate feature vector set based on the conditional features; and performing feature dimension reduction on the intermediate feature vector set by the second gated recurrent network to obtain the dimension reduced feature set based on the conditional features.

16. The electronic device according to claim 11, wherein the performing frequency division and time-domain down-sampling on the current frame of each acoustic feature frame to obtain n subframes corresponding to the current frame, comprises:

performing frequency-domain division on the current frame to obtain n initial subframes; and down-sampling time-domain sampling points corresponding to the n initial subframes to obtain the n subframes.

17. A non-transitory computer-readable storage medium, storing executable instructions, and when executed by a processor, causing the processor to implement:

performing speech feature conversion on a text to obtain at least one acoustic feature frame;

extracting a conditional feature corresponding to each acoustic feature frame from each acoustic feature frame of the at least one acoustic feature frame by a frame rate network;

performing frequency division and time-domain down-sampling on the current frame of each acoustic feature frame to obtain n subframes corresponding to the current frame, n being a positive integer greater than 1, and each subframe of the n subframes comprising a preset number of sampling points;

synchronously predicting, by a sampling prediction network, in an ith prediction process, sample values corresponding to current m adjacent sampling points on the n subframes to obtain m×n sub-prediction values, and obtain n sub-prediction values corresponding to each sampling point of the preset number of sampling points, i being a positive integer greater than or equal to 1, and m being a positive integer greater than or equal to 2 and less than or equal to the preset number;

obtaining an audio prediction signal corresponding to the current frame according to the n sub-prediction values corresponding to each sampling point; and performing audio synthesis on the audio prediction signal corresponding to each acoustic feature frame of the at least one acoustic feature frame to obtain a target audio corresponding to the text.

18. The computer-readable storage medium according to claim 17, wherein when m equals to 2, the sampling prediction network comprises 2n independent fully connected layers, and the two adjacent sampling points comprise: in the ith prediction process, sampling point t corresponding to the current time t and sampling point t+1 corresponding to the next time t+1, t being a positive integer greater than or equal to 1;

the synchronously predicting sample values corresponding to the current m adjacent sampling points on the n subframes to obtain m×n sub-prediction values, comprises:

in the ith prediction process, based on at least one historical sampling point at time t corresponding to the sampling point t, performing linear coding prediction, by the sampling prediction network, on linear sample values of the sampling point t on the n subframes, to obtain n sub-rough prediction values at time t;

when i is greater than 1, based on a historical prediction result corresponding to the (i−1)th prediction process, and combined with the conditional features, by 2n fully connected layers, performing forward residual prediction synchronously on residuals of the sampling point t and residuals of the sampling point t+1 on each subframe of the n subframes respectively, to obtain n residuals at time t corresponding to the sampling point t and n residuals at time t+1 corresponding to the sampling point t+1, the historical prediction result comprising n residuals and n sub-prediction values corresponding to each of two adjacent sampling points in the (i−1)th prediction process;

performing linear coding prediction on linear sampling values of the sampling point t+1 on the n subframes to obtain n sub-rough prediction values at time t+1 based on at least one historical sampling point at time t+1 corresponding to the sampling point t+1;

obtaining n sub-prediction values at time t corresponding to the sampling point t according to the n residuals at time t and the n sub-rough prediction values at time t, and obtaining n sub-prediction values at time t+1 according to the n residuals at time t+1 and the n sub-rough prediction values at time t+1; and using the n sub-prediction values at time t and the n sub-prediction values at time t+1 as 2n sub-prediction values.

19. The computer-readable storage medium according to claim 18, wherein the executable instructions further cause the processor to implement:

when t is less than or equal to a preset window threshold, using all sampling points before the sampling point t as the at least one historical sampling point at time t, the preset window threshold representing the maximum quantity of sampling points processible by linear coding prediction; or when t is greater than the preset window threshold, using sampling points in a range of the sampling point t−1 to sampling point t−k, as the at least one historical sampling point at time t, k being the preset window threshold.

20. The computer-readable storage medium according to claim 18, wherein the executable instructions further cause the processor to implement:

when i is equal to 1, by 2n fully connected layers, combined with the conditional features and preset excitation parameters, performing forward residual prediction on residuals of the sampling point t and the sampling point t+1 on the n subframes synchronously, to obtain n residuals at time t corresponding to the sampling point t and n residuals at time t+1 corresponding to the sampling point t+1;

based on at least one historical sampling point at time t+1 corresponding to the sampling point t+1, performing linear coding prediction on linear sampling values of the sampling point t+1 on the n subframes to obtain n sub-rough prediction values at time t+1; and obtaining n sub-prediction values at time t corresponding to the sampling point t according to the n residuals at time t and the n sub-rough prediction values at time t, and obtaining n sub-prediction values at time t+1 according to the n residuals at time t+1 and the n sub-rough prediction values at time t+1; and using the n sub-prediction values at time t and the n sub-prediction values at time t+1 as the 2n sub-prediction values.

* * * * *